United States Patent [19]

Hubbs et al.

[11] Patent Number: 5,281,691

[45] Date of Patent: Jan. 25, 1994

[54] POLY(3-HYDROXYALKANOATES)

[75] Inventors: John C. Hubbs; Marti N. Harrison, both of Kingsport, Tenn.

[73] Assignee: Eastman Kodak Company, Rochester, N.Y.

[21] Appl. No.: 901,306

[22] Filed: Jun. 19, 1992

[51] Int. Cl.$^5$ .................... C08G 63/06; C08G 63/66; C08G 65/02

[52] U.S. Cl. .................................. 528/361; 528/354

[58] Field of Search ........................... 528/354, 361

[56]  References Cited

U.S. PATENT DOCUMENTS

| | | | |
|---|---|---|---|
| 2,917,410 | 12/1959 | Vitalis | 528/354 |
| 3,021,309 | 2/1962 | Cox et al. | |
| 3,021,310 | 2/1962 | Cox et al. | |
| 3,021,311 | 2/1962 | Cox et al. | |
| 3,021,312 | 2/1962 | Cox et al. | |
| 3,021,313 | 2/1962 | Cox et al. | |
| 3,021,314 | 2/1962 | Cox et al. | |
| 3,021,315 | 2/1962 | Cox et al. | |
| 3,021,316 | 2/1962 | Cox et al. | |
| 3,021,317 | 2/1962 | Cox et al. | |
| 3,781,381 | 12/1973 | Koleske et al. | |
| 3,922,239 | 11/1975 | Koleske et al. | |
| 4,349,469 | 9/1982 | Davis et al. | 524/765 |
| 4,372,311 | 2/1983 | Potts | 128/287 |
| 4,393,167 | 7/1983 | Holmes et al. | 525/64 |
| 4,427,614 | 1/1984 | Barham et al. | 264/210.1 |
| 4,699,974 | 10/1987 | Evans | 528/354 |
| 4,880,592 | 11/1989 | Martini et al. | 264/514 |
| 5,023,316 | 6/1991 | Benvenuti et al. | 528/357 |
| 5,076,983 | 12/1991 | Loomis et al. | 264/101 |
| 5,138,029 | 8/1992 | Nishiska et al. | 528/354 |

FOREIGN PATENT DOCUMENTS 742294 9/1966 Canada .

OTHER PUBLICATIONS

Z. Jedlinski, M. Kowalczuk, W. Glowkowski, J. Grobelny, "Discloses the Polymerization of Beta–Butyrolactone Using Dissolved Potassium Salts", *Macromolcules*, 1991, pp. 349–352.

S. Glowinkowski, J. Kapturczak, Z. Pajak, P. Kurcok, Z. Jedlinski, "Nuclear Magnetic Resonance Studies of Molecular Dynamics of β-Propiolactone Homopolymer and its Block Copolymer with β-Butyrolactone", *Polymer*, 1989, vol. 30, pp. 519–523.

Z. Jedlinski, P. Kurcok, M. Kowalczuk, "Polymerization of β-Lactones Initiated by Potassium Solutions", *Macromolecules*, 1985, pp. 2679–2683.

Z. Jedlinski, A. Misiolek, P. Kurcok, "Enolate Anions. 2. Reaction between Potassium Solutions Containing Crown Ethers and β-Lactones", *J. Org. Chem.*, 1989, pp. 1500–1501.

Z. Jedlinski, P. Kurcok, M. Kowalczuk, J. Kasperczyk, "Anionic Polymerization of 4-methyl-2-oxetanone", *Makromol. Chem.*, 1986, pp. 1651–1656.

Z. Jedlinski, M. Kowalczuk, A. Misiolek, "An Unexpected Outcome of the Reaction Between β-Lactones and Dissolved Potassium", *J. Chem. Soc.*, 1988, pp. 1261–1262.

A. Duda, "Anionic Polymerization of 4-Methyl-2-Oxetanone" (β-Butyrolactone), *Journal of Polymer Science*, 1992, pp. 21–29.

Y. Doi, "Physical Properties and Biodegradability of Blends of Isotactic and Atactic Poly" (3-Hydroxybutyrate), *Makromol. Chem., Rapid Commun.*, 1992, pp. 179–183.

(List continued on next page.)

Primary Examiner—John Kight, III
Assistant Examiner—T. Mosley
Attorney, Agent, or Firm—Mark A. Montgomery; William P. Heath, Jr.

[57] ABSTRACT

Novel poly(3-hydroxyalkanoates), such as poly(3-hydroxybutyrate), and blends of these with other polymers are disclosed. A novel process for producing these poly(3-hydroxyalkanoates) is also disclosed which entails polymerizing one or more β-substituted-β-propiolactone(s) under polymerization conditions in the substantial absence of water in the presence of an anionic initiator.

12 Claims, No Drawings

OTHER PUBLICATIONS

G. Gokel, "Crown Ethers & Cryptands", *Royal Society of Chemistry*, 1991, pp. 74, 79, and 80.

Z. Jedlinski, M. Kowalczuk, P. Kurcok, "Anionic Ring-Opening Polymerization by Alkali Metal Solutions", *Makromol. Chem., Macromol. Symp.*, 1986, pp. 277-293.

Z. Jedlinski, M. Kowalczuk, P. Kurcok, *Macromolecules*, 1991, pp. 1218-1219.

P. Kurcok, M. Kowalczuk, K. Hennek, Z. Jedlinski, "Anionic Polymerization of β-Lactones Initiated with Alkali-Metal Alkoxides: Reinvestigation of the Polymerization Mechanism", *Macromolecules*, 1992, pp. 2017-2020.

S. C. Arnold, "Synthesis of Stereoregular Poly(Alkyl Malolactonates) and the Application of Poly(Beta--Malic Acid) in Drug Delivery Systems", *Ph.D. Dissertation*, 1987.

J. Kemnitzer, S. McCarthy, R. Gross, "The Polymerization of [S]-Beta-Butyrolactone to Obtain New Degradable Materials", *Polym. Prpr.*, 1990, pp. 435-436.

M. Benvenuti, R. Lenz, "Polymerization and Copolymerization of β-Butyrolactone and Benzyl-6-2-Malolactonate by Aluminoxane Catalysts", *Journal of Polymer Science*, 1991, pp. 793-805.

K. Teranishi, M. Iida, T. Araki, S. Yamashita, H. Tani, "Stereospecific Polymerization of β-Alkyl-β-Propiolactone", *Macromolecules*, 1974, pp. 421-427.

H. Kricheldorf, M. Berl, N. Scharnagl, "Poly(lactones). 9. Polymerization Mechanism of Metal Alkoxide Initiated Polymerization of Lactide and Various Lactones", *Macromolecules*, 1988, pp. 286-293.

N. Tanahashi, Y. Doi, "Thermal Properties and Stereoregularity of Poly(3-hydroxybutyrate) Prepared from Optically Active β-Butyrolactone with a Zinc-Based Catalyst", *Macromolecules*, 1991, pp. 5732-5733.

M. Iida, T. Araki, K. Teranishi, H. Tani, "Effect of Substituents on Stereospecific Polymerization of β-Alkyl-and β-Chloroalkyl-62-propiolactones", *Macromolecules*, 1977, pp. 275-284.

R. Gross, Y. Zhang, G. Konrad, R. Lenz, "Polymerization of β-Monosubstituted-62-propiolactones Using Trialkylaluminum-Water Catalytic Systems and Polymer Characterization", *Macromolecules*, 1988, pp. 2657-2668.

H. Kricheldorf, N. Scharnagl, "Polyactones. 17. Anionic Polymerization of β-D,L-Butyrolactone", *J. Macromol. Sci-Chem.*, 1989, pp. 950-969.

Y. Zhang, R. Gross, R. Lenz, "Stereochemistry of the Ring-Opening Polymerization of (S)-β-Butyrolactone", *Macromolecules*, 1990, pp. 3206-3212.

G. Ceccorulli, M. Pizzoli, M. Scandola, "Blends of Cellulose Esters with Bacterial Poly(3-Hydroxybutyrate)", *Cellulose '91*, 1991, 273.

J. Kemnitzer, S. McCarthy, R. Gross, "Poly(β-hydroxybutyrate) Stereoisomers: A Model Study of the Effects of Stereochemical and Morphological Variables on Polymer Biological Degradability", *Macromolecules*, 1992, pp. 5927-5934.

J. Shelton, J. Lando, D. Agostini, "Synthesis and Characterization of Poly(β-Hydroxybutyrate)", *Polymer Letters*, 1971, pp. 173-178.

S. Bloembergen, D. Holden, "Isodimorphism in Synthetic Poly(β-hydroxybutyrate-co-β-hydroxyvalerate): Stereoregular Copolyesters from Racemic β-Lactones", *Macromolecules*, 1989, pp. 1663-1669.

T. Yasuda, T. Aida, S. Inoue, "Living Polymerization of β-Butyrolactone Catalysed by Tetraphenylporphinatoaluminum Chloride", *Makromol. Chem., Rapid Commun.*, 1982, pp. 585-588.

T. Yasuda, T. Aida, S. Inoue, "Synthesis of End-Reactive Oligomers with Controlled Molecular Weight By Metalloporphyrin Catalyst", *Polymer Preprints*, 1982, pp. 146-147.

T. Yasuda, T. Aida, S. Inoue, "Synthesis of End-Reaction Polymers with Controlled Molecular Weight by Metalloporphyrin Catalyst", *J. Macromol. Sci.-Chem.*, 1984, pp. 1035-1047.

T. Yasuda, T. Aida, S. Inoue, "Synthesis of Polyester-Polyether Block Copolymer with Controlled Chain Length from β-Lactone and Epoxide by Aluminum Porphyrin Catalyst", *Macromolecules*, 1984, pp. 2217-2222.

S. Asano, T. Aida, S. Inoue, "Polymerization of Epoxide and β-Lactone Catalyzed by Aluminum Porphyrin. Exchange of Alkoxide or Carboxylate Group as Growing Species on Aluminum Porphyrin", *Macromolecules*, 1985, pp. 2057-2061.

List continued on next page.

OTHER PUBLICATIONS

J. Vergara, R. Figini, "Synthesis of Poly(DL-β-hydroxybutyric acid)", *Makromol. Chem.*, 1977, pp. 267–270.

A. Borgne, N. Spassky, "Synthesis and Properties of Racemic and Optically Active Poly(β-Hydroxybutyrate)", *Polymer Piepr.*, 1988, pp. 598–599.

T. Araki, S. Hayase, "Biodegradability of Snythetic β-Substituted Poly-β-Esters", *Journal of Polymer Science*, 1979, pp. 1877–1881.

M. Iida, S. Hayase, T. Araki, "$^{13}$C-NMR Spectroscopy of Poly(β-substituted β-propiolactone)s. Tacticity Recognition in 1,5-Substituted Polymer System and Stereospecific Contact of Shift Reagent", *Macromolecules*, 1978, pp. 490–493.

T. Yasuda, T. Aida, S. Inoue, "Living Polymerization of β-Lactone Catalyzed by (Tetraphenylporphinato)aluminum Chloride. Structure of the Living End", *Macromolecules*, 1983, pp. 1792–1796.

T. Hirosye, T. Einaga, H. Fujita, "Excluded-Volume Effects in Dilute Polymer Solutions. VIII. Poly(D-,L-β-methyl β-propiolactone) in Several Solvents and Reanalysis of Data on Poly(D-β-hydroxybutyrate)", *Polymer Journal*, 1979, pp. 819–826.

Y. Okamoto, "Cationic Ring-Opening Polymerization of Lactones in the Presence of Alcohol", *Makromol. Chem., Macromol. Symp.*, 1991, pp. 117–133.

M. Avella, E. Martuscelli, "Poly-D-(−) (3-hydroxybutyrate)/poly(ethylen oxide) blends: phase diagram, thermal and crystallization behaviour", *Polymer Papers*, 1988, pp. 1731–1737.

H. Tani, S. Yamashita, K. Teranishi, "Stereospecific Polymerization of β-Methyl-β-propiolactone", *Polymer Journal*, 1972, pp. 417–418.

T. Takeichi, Y. Hieda, Y. Takayama, "Asymmetric Selective Polymerization of β-Butyrolactone Catalyzed by Optically Active Cobalt Complex/Triethylaluminum System", *Polymer Journal*, 1988, pp. 159–162

A. Le Borgne, N. Spassky, "Stereoelective polymerization of β-butyrolactone", *Polymer*, 1989, pp. 2312–2319.

S. Bloembergen, D. Holden, "Stereoregularity in Synthetic β-Hydroxybutyrate and β-Hydroxyvalerate Homopolyesters", *Macromolecules*, 1989, pp. 1656–1663.

M. Yokouchi, Y. Chatani, H. Tadokoro, H. Tani, "Structural Studies of Polyesters. VII. Molecular and Crystal Structures of Racemic Poly(β-ethyl-β-propiolactone)", *Polymer Journal*, 1974, pp. 248–255.

Y. Yamashita, Y. Ishikawa, T. Tsuda, S. Miura, 1963, pp. 104–109.

S. Bloembergen, D. Holden, T. Bluhm, G. Hamer, R. Marchessault, "Synthesis of Crystalline β-Hydroxybutyrate/β-Hydroxyvalerate Copolyesters by Coordination Polymerization of β-Lactones", *Macromolecules*, 1987, pp. 3086–3089.

P. Guerin, J. Fracillette, C. Braud, M. Vert, "Benzyl Ester of Optically Active Malic Acid Stereocopolymers as Obtained by Ring-Opening Polymerization of (R)-(+) and (S)-(−)-Benzyl Malolactonates", *Makromol. Chem., Macromol. Symp.*, 1986, pp. 305–314.

T. Araki, "Selective Synthesis of Structrually Isomeric Poly-β-Ester and Poly-β-Ester from β-(2-Acetoxy-Ethyl)-β-Propiolactone with Al and Zn Catalysts" *Journal of Polymer Science*, 1982, pp. 3337–3350.

R. Voyer, R. Prud'homme, "Polymerization of Optically Active β-Substituted β-Propiolactones. IV. β-1,-1-Dichloroalkyl β-Propiolactones Polymerized with Aluminum Triisopropoxide", *Journal of Polymer Science*, 1988, pp. 117–129.

C. LaValle, A. Leborgne, N. Spassky, R. Prud'homme, "Synthesis and Polymerization of Racemic and Optically Active β-Substituted β-Propiolactones. II: β-Monosubstituted and β-Disubstituted Monomers and Polymers with Different Optical Purities", *Journal of Polymer Science*, 1987, pp. 1315–1328.

C. Lavallee, G. Lemay, A. Leborgne, N. Spassky, R. Prud'homme, "Synthesis and Polymerization of Racemic and Optically Active β-Monosubstituted β-Propiolactones", *Macromolecules*, 1984, pp. 2457–2462.

V. Vincens, A. LeBorgne, N. Spassky, "Aluminium Complex of a Schiffs Base as New Initiator for Oligomerization of Heterocycles", *Makromol. Chem., Macromol, Symp.*, 1991, pp. 285–291.

C. Lavallee, D. Grenier, R. Prud'homme, A. Leborgne, N. Spassky, "Synthesis and Properties of Racemic and Optically Active Substituted Poly(β-Propiolactones)", *Polymer Science and Technology*, 1985, pp. 441–460.

R. Voyer, R. Prud'homme, "Synthesis and Polymerization of Raceic and Optically Active β-Substituted β—

(List continued on next page.)

OTHER PUBLICATIONS

Propiolactones. III. β-Monosubstituted Monomers and Polymers", *Journal of Polymer Science*, 1986, pp. 2773-2787

D. Agostini, J. Lando, J. Shelton, "Synthesis and Characterization of Poly-β-Hydroxybutyrate. I. Synthesis of Crystalline DL-Poly-β-Hydroxybutyrate from DL-β-Butyrolactone", *Journal of Polymer Science*, 1971, pp. 2775-2787.

J. Shelton, D. Agostini, J. Lando, "Synthesis and Characterization of Poly-β-Hydroxybutyrate. II. Synthesis of D-Poly-β-hydroxybutyrate and the Mechanism of Ring-Opening Polymerization of β-Butyrolactone", *Journal of Polymer Science*, 1971, pp. 2789-2799.

N. Billingham, M. Proctor, J. Smith, "Polymerization and copolymerization of β-butyrolactone by aluminium compounds", *Journal of Organometallic Chemistry*, 1988, pp. 83-87.

D. Johns, R. Lenz, M. Vert, "Poly(Malic Acid) Part I-Preparation and Polymerization of Benzyl Malolactonate", *Journal of Bioactive and Compatible Polymers*, 1986, pp. 47-60.

S. Arnold, R. Lenz, "Synthesis of Stereoregular Pol(Alkyl Malolactonates", *Makromol. Chem., Macromol. Symp.*, 1986, pp. 285-303.

R. Lenz, "Stereoregular Poly-β-hydroxyalkanoates: Produced by Bacteria or Prepared from β-Lactones", *Polymer Preprints*, 1989, pp. 416-417.

M. Camps, R. Lenz, P. Hemery, S. Boileau, "Anionic Polymerization of α-Methyl-α-n-Propyl-βPropiolactone in THF", *Polymer Preprints*, 1988, pp. 25-26.

Y. Kawaguchi, Y. Doi, "Kinetics and Mechanism of Synthesis and Degradation of Poly(3-hydroxybutyrate) in *Alcaligenes eutrophus*", *Macromolecules*, 1992, pp. 2324-2329.

Y. Kumagai, Y. Doi, "Enzymatic degradation of poly(-3-hydroxybutyrate)-based blends: poly(3-hydroxybutyrate)/poly(ethylene oxide) blend", *Polymer Degradation and Stability*, 1992, pp. 87-93.

H. Brandl, R. Gross, R. Lenz, R. Fuller, "Plastics from Bacteria and for Bacteria: Poly(β-Hydroxy-alkanoates)as Natural, Biocompatible, and Biodegradable Polyesters", *Advances in Biochemical Engineering/Biotechnology*, 1990, pp. 78-93.

POLY(3-HYDROXYALKANOATES)

FIELD OF THE INVENTION

The present invention relates to novel poly(3-hydroxyalkanoates) and blends with other polymers. The present invention further relates to a process for the production of poly(3-hydroxyalkanoates) in the substantial absence of water in the presence of an anionic initiator. The present invention also relates to biodegradable articles produced from the poly(3-hydroxyalkanoates).

BACKGROUND OF THE INVENTION

Poly(3-hydroxyalkanoates) are naturally occurring thermoplastic polymers currently isolated from bacteria and other microorganisms. Unlike many thermoplastic polymers, poly(3-hydroxyalkanoates) and in particular poly(3-hydroxybutyrate) have been shown to be biodegradable and environmentally non persistent. Poly(3-hydroxyalkanoates) have the additional feature of being both thermally and hydrolyticly unstable and thus can degrade without microbial intervention. However, the high cost of processing and isolating poly(3-hydroxyalkanoates) derived from natural sources has inhibited the wide spread use of these biodegradable polymers in commercial applications. A low cost synthetic method for the preparation of poly(3-hydroxyalkanoates) is, therefore, highly desirable.

Previous attempts at the production of poly(3-hydroxyalkanoates) by the polymerization of $\beta$-substituted-$\beta$-propiolactones generally fall into two categories, acid catalyzed reactions generally characterized by the use of Lewis acid catalysts containing metals such as aluminum or zinc, or anionic ring opening polymerizations. Examples of acid catalyzed polymerization of $\beta$-substituted-$\beta$-propiolactones can be found in the work of Tani et al. (*Macromolecules.* 10, 275 (1977) and Lenz et al. (*Macromolecules* 21, 2657,(1988).

The Lewis acids most frequently used in the acid catalyzed polymerizations have included triethyaluminium/water complexes (often referred to as aluminoxanes) and diethyl zinc/water systems as well as transition metal alkoxides such as aluminum triisopropoxide.

Examples of anionic ring opening polymerization of $\beta$-substituted-$\beta$-propiolactones can be found in the work of Tani et al. (*Macromolecules,* 10, 275 (1977), Kricheldorf et al. (*J. Macromol. Sci.-Chem. A26,* 951 (1989), and the work of Jedlinski et al. *Macromolecules,* 24, 349, 1991). These references generally disclose that anionic ring opening polymerization occurs via nucleophilic attack at the $\beta$-carbon of the $\beta$-substituted-$\beta$-propiolactones. However, this type of polymerization is slow and produces low molecular weight polymers. Tani et al. also disclose that the anionic ring opening polymerization of $\beta$-alkyl or $\beta$-haloalkyl-$\beta$-propiolactones using conventional anionic catalysts either results in no ring opening or the termination of propagation at a very early stage.

Kricheldorf et al. disclose that, in solution or in bulk, non ionic bases or ionic bases either result in no reaction or cause significant chain termination (often indicated by crotonate end group formation) during the ring opening polymerization of $\beta$-butyrolactone. Kricheldorf et al. isolated only low molecular weight polymer using reaction temperatures of 50° C. and reaction times of 48 hours.

Jedlinski et al. using potassium naphthalide in terahydrofuran solution in presence of 18-crown-6 or cryptand [2, 2, 2] produced low molecular weight poly(3-hydroxybutyrate) from $\beta$-butyrolactone at room temperature with reaction times ranging from 96 to 200 hours. Using reaction times of 80 to 100 hours, Jedlinski et al. also demonstrated the preparation of low molecular weight poly(3-hydroxybutyrate) from $\beta$-butyrolactone using potassium acetate/18-crown-6 or potassium crotonate/18-crown-6 as a polymerization initiator.

In light of the above it would be very desirable to be able to produce poly(3-hydroxyalkanoates) from $\beta$-substituted-$\beta$-propiolactones of higher molecular weights at increased reaction rates and higher yields.

SUMMARY OF THE INVENTION

The composition of the present invention comprises an atactic poly(3-hydroxyalkanoate) containing stereorandom recurring units of the formula:

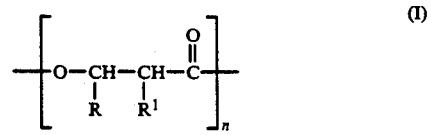

wherein n is an integer from 700 to 12,000 and R and $R^1$ are each independently selected from saturated and unsaturated $C_1$ to $C_{20}$ alkyls, and substituted alkyls $C_3$ to $C_{10}$ aryls and substituted aryls, and $C_5$ to $C_{10}$ cycloalkyls and substituted cycloalkyls and wherein $R^1$ can also be hydrogen.

A further composition of the present invention comprises a poly(3-hydroxyalkanoate) containing recurring units of the formula:

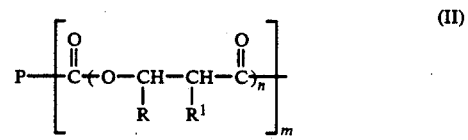

wherein n is an integer from 10 to 12,000; m is an integer of at least 2; and R and $R^1$ are each independently selected from saturated and unsaturated $C_1$ to $C_{20}$ alkyls and substituted alkyls, $C_3$ to $C_{10}$ aryls and substituted aryls, and $C_5$ to $C_{10}$ cycloalkyls and substituted cycloalkyls, and wherein $R^1$ can also be hydrogen.

An additional composition the present invention comprises a poly(3-hydroxyalkanoate) containing recurring units of the formula:

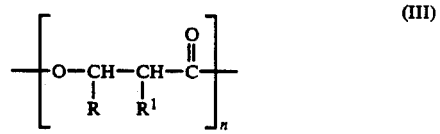

wherein n is an integer from 10 to 12,000 and R and $R^1$ are each independently selected from saturated and unsaturated, $C_1$ to $C_{20}$ alkyls and substituted alkyls, $C_3$ to $C_{10}$ aryls and substituted aryls, and $C_5$ to $C_{10}$ cycloalkyls and substituted cycloalkyls.

An additional feature of the present invention comprises a blend containing 1 to 99 % by weight of the above novel poly(3-hydroxyalkanoates) and 1 to 99 weight % of at least one other polymer such as a polyether, a cellulose ester, a starch or starch ester, a polyester, a polyesterether, or polyacrylate.

The process for producing poly(3-hydroxyalkanoates) according to the present invention comprises contacting a solution containing about 1 to about 100 mole percent of at least one β-substituted-β-propiolactone, containing less than 5,000 ppm water, with an anionic initiator under polymerization conditions to produce a poly(3-hydroxyalkanoate).

DETAILED DESCRIPTION OF THE INVENTION

Applicants have unexpectedly discovered high molecular weight atactic poly(3-hydroxyalkanoates). Applicants have also unexpectedly discovered novel poly(3-hydroxyalkanoates). The poly(3-hydroxyalkanoates) are generally prepared by a novel process for the anionic ring opening polymerization of β-substituted-β-propiolactones (monomer) to produce the poly(3-hydroxyalkanoates) When using racemic monomer, this process typically produces atactic polymer of low Tg which among other things can be used for blending with other polymers. Typically when using chiral monomer or a mixture of chiral and racemic monomer, this process produces isotactic or partially isotactic polymer with significant crystalline regions.

As with other polymers, having similar physical properties, the poly(3-hydroxyalkanoates) of the present invention are useful in many applications. These poly(3-hyroxyalkanoates) can be made into many different articles either alone or as a blend with other compatible polymers such as molded articles, fibers, and films. These poly(3-hydroxyalkanoates) can be formed into novel blends of, either atactic and/or isotactic polyhydroxyalkanoates, with cellulose esters, aliphatic polyesters, aromatic polyesters, starch and starch esters, and aliphatic/aromatic polyesters. Such blends with poly(3-hydroxyalkanoates) have been found to be unexpectedly biodegradable.

The composition of the present invention comprises the high molecular weight atactic poly(3-hydroxyalkanoate) containing stereorandom recurring units of the formula:

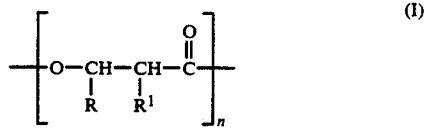

(I)

wherein n is an integer from 700 to 12,000 and R and $R^1$ are each independently selected from saturated and unsaturated $C_1$ to $C_{20}$ alkyls and substituted alkyls, $C_3$ to $C_{10}$ aryls and substituted aryls, $C_5$ to $C_{10}$ cycloalkyls and substituted cycloalkyls, and wherein $R^1$ can also be hydrogen and is preferably hydrogen.

The term "alkyl" means straight or branched alkyl moieties of up to 20 carbon atoms such as methyl, ethyl, n-propyl, isopropyl, n-butyl, isobutyl, sec-butyl, pentyl, hexyl, heptyl, octyl, nonyl, decyl, docecyl, and the like. Preferred alkyl groups are $C_1$ to $C_5$ straight or branched chain alkyls.

In the present invention, the substituted alkyls, aryls and cycloakyls preferably have no more than 4 substituents with each substituent being independently selected from halo, $C_3$–$C_{10}$ aryl, $C_7$–$C_{12}$ arylakyl, $C_1$–$C_{10}$ alkoxy, $C_1$–$C_{10}$ acyl, cyano, $C_1$–$C_{10}$ carboxyalkyl, and $C_2$–$C_{10}$ acyloxy.

Examples of the above substituted alkyl groups include the cyanomethyl, nitromethyl, propionyloxymethyl, methoxymethyl, ethoxymethyl, 1-butoxymethy, acetoxymethyl, chloromethyl, bromomethyl, iodomethyl, 2,4-dichloro(n-butyl), 2-carbamoyloxyethyl and the like.

The term "$C_1$ to $C_{10}$ alkoxy" as used herein denotes groups of the formula $OR^7$ wherein $R^7$ is hydrogen or alkyl. Examples of preferred $C_1$ to $C_{10}$ alkoxy groups include methoxy, ethoxy, n propoxy, isopropoxy, butoxy and like groups.

The term "$C_1$ to $C_{10}$ acyl" or "acyl" denotes groups of the formula

containing between 1 and 10 carbon atoms, wherein $R^6$ is hydrogen, alkyl, aryl, substituted alkyl, arylalkyl, and substituted arylalkyl.

Examples of preferred $C_1$ to $C_{10}$ acyl groups are those wherein $R^6$ is a $C_1$ to $C_{10}$ alkyl group such as methyl, ethyl, propyl, or butyl.

The term "$C_2$ to $C_{10}$ acyloxy" or "acyloxy" denotes of the formula

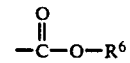

containing between 2 and 10 carbon atoms, wherein $R^6$ is a defined here above with the exception that for acyloxy it is preferred that $R^6$ not be hydrogen. Examples of preferred $C_1$ to $C_{10}$ acyloxy groups include those wherein $R^6$ is a $C_1$ to $C_6$ alkyl group such as methyl, ethyl, propyl, or butyl. Further examples of preferred $C_2$ to $C_{10}$ acyloxy groups include those wherein $R^6$ is a $C_7$ to $C_{12}$ arylalkyl group.

The term "$C_1$–$C_{10}$ carboxyalkyl denotes groups of the formula

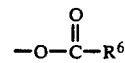

wherein $R^6$ is defined here above. Examples of preferred $C_1$ to $C_{10}$ carboxyalkyl groups are those wherein $R^6$ is a $C_1$ to $C_6$ alkyl group such as methyl, ethyl, propyl, or butyl.

The term "halo" and "halogen" refer to the fluoro, chloro, bromo, or iodo groups.

The term "$C_7$ to $C_{12}$ arylalkyl" denotes a $C_1$ to $C_6$ alkyl group substituted at any position by an aromatic ring. Examples of such a group include phenylmethyl (benzyl), 2-phenylethyl, 3-phenyl-(n-propyl), 4-phenylhexyl, 3-phenyl-hexyl, 3-phenyl-(n-amyl), 3-phenyl-(secbutyl), and the like.

The term $C_3$ to $C_{10}$ aryl refers to any aromatic system including heteroaromatic systems containing from 3 to 10 carbon atoms. Examples of such systems include furyl, imidazolyl, pyridyl, phenyl, naphthyl, and the like.

This high molecular weight polymer (I), is preferably essentially linear. In the high molecular weight atactic poly(3-hydroxyalkanoate) of the present invention (I), n is preferably an integer from 700 to 10,000; preferably 700 to 5,000; with an integer of 2,000 to 5,000 being most preferred. The higher molecular weight atactic poly(3-hydroxyalkanoate), (I), is generally useful in blends with other polymers.

The high molecular weight poly(3-hydroxyalkanoate), (I), preferably has an inherent viscosity of 0.2 to 6 at 25° C. on a 0.5 g sample and 100 ml of a 60/40 by weight solution of phenol/tetrachloroethane, more preferably 0.4 to 2. The higher inherent viscosities are generally more preferred.

The high molecular weight atactic poly(3-hydroxyalkanoate), (I), of the present invention preferably has a polydispersity between 1 and 10, more preferably between 1 and 3, even more preferably between 1 and 2, with a polydispersity between 1 and 1.7 being most preferred.

The high molecular weight atactic poly(3-hydroxyalkanoate) of the present invention can be a homopolymer containing identical recurring units of the above formula or can be a copolymer in which R and $R^1$ of the recurring units are independently selected. Included within the copolymers are the block copolymers in which the reoccurring units are identical for only a portion of the entire polymer chain. R and $R^1$ are preferably selected from $C_1$ to $C_{20}$ alkyls with the $C_1$ to $C_5$ alkyl being more preferred and with $R^1$ most preferably being hydrogen. The most preferred poly(3-hydroxyalkanoate) is poly(3-hydroxybutyrate), meaning R is methyl and $R^1$ is hydrogen.

Another composition of the present invention comprises 2 or more covalently bound chains of poly(3-hydroxyalkanoate) containing units of the formula:

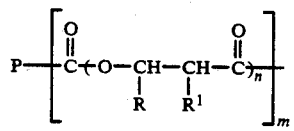
(II)

wherein n is an integer from 10 to 12,000; m is an integer of at least 2; and R and $R^1$ are each independently selected from saturated and unsaturated $C_1$ to $C_{20}$ alkyls and substituted alkyls, $C_3$ to $C_{10}$ aryls and substituted aryls, $C_5$ to $C_{10}$ cycloalkyls and substituted cycloalkyls and $R^1$ can also be hydrogen.

In the formula, (II), above, P is preferably a monomeric carbon skeleton backbone or polymeric skeleton backbone bearing polycarboxy functionality. An example of a polymeric skeleton backbone bearing polycarboxyl functionality is a cellulose acetate succinate containing at least 2 or more carboxylate groups. Examples of monomeric carbon skeleton backbones are carboxy substituted alkyls such as 1,2,3,-propanetricarboxylate and 1,2,3,4-butane tetracarboxylate.

In the formula (II), above, m is preferably an integer of 2 to 1,000. Alternatively m is preferably an integer of at least 3 with m being an integer from 3 to 100 being most preferred.

In the composition of the present invention that contains chains of poly(3-hydroxyalkanoate) on P represented by formula (II), n can be an integer from 10 to 12,000, but is preferably an integer from 150 to 10,000. Process problems can result when m is a large integer and/or when n is a large integer, due to high viscosities when using minimal amounts of solvent. Additionally, higher reaction rates can be achieved when n is a smaller integer (150 to 1,000). Even in cases of small n, high molecular weight polymer can be obtained through the proper choice of m.

As with the atactic poly(3-hydroxyalkanoate) of formula (I), the above composition (II) containing the chains of poly(3-hydroxyalkanoate), is preferably of higher molecular weight.

Preferably, poly(3-hydroxyalkanoate) of formula (II), has a polydispersity of greater than 1 up to 10, preferable greater than 1 up to 3, more preferable greater than 1 up to 2, with a polydispersity of 1.05 to 1.7 being most preferred.

Such exceptionally narrow polydispersities result in a narrower range of polymer properties for any particular preparation. One very apparent advantage of these narrow polydispersities is the nearly complete lack of low molecular weight components in polymers of high to medium molecular weight.

Preferred R and $R^1$ in (II) are the same as the preferred R and $R^1$ in (I). As with high molecular weight atactic poly(3-hydroxyalkanoate) of formula (I), the branched poly(3-hydroxyalkanoate) of formula (II), can be a homopolymer containing identical recurring units of the formula or can be a copolymer, including block copolymer, in which R and $R^1$ of the recurring units are independently selected. The branched poly(3-hydroxyalkanoate) also preferably has an inherent viscosity of 0.2 to 6 at 25° C. on a 0.5 g sample and 100 ml of a 60/40 by weight solution of phenol/tetrachloroethane, more preferably between 0.4 to 2. Higher inherent viscosities are typically preferred. R and $R^1$ are preferably selected from $C_1$ to $C_5$ alkyls with $R^1$ more preferably being hydrogen, and R being methyl.

An additional composition of the present invention is the bisubstituted poly(3-hydroxyalkanoate) and comprises a poly(3-hydroxyalkanoate) containing recurring units of the formula:

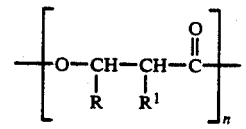
(III)

wherein n is an integer from 10 to 12,000 and R and $R^1$ are each independently selected from saturated and unsaturated $C_1$ to $C_{20}$ alkyls and substituted alkyls, $C_3$ to $C_{10}$ aryls and substituted aryls, and $C_5$ to $C_{10}$ cycloalkyls and substituted cycloalkyls. R and $R^1$ are preferably selected from $C_1$ to $C_5$ alkyls.

In the poly(3-hydroxyalkanoate) composition with units of formula (III), n is preferably an integer from 150 to 10,000 more preferably 700 to 10,000 and even more preferably 1,000 to 3,000.

As with the above high molecular weight atactic poly(3-hydroxyalkanoate) with units of formula (I), the bisubstituted poly(3-hydroxyalkanoate), (III), has a polydispersity of greater than 1 up to 10, preferably greater than ; up to 3, more preferable greater than 1 up to 2, with a polydispersity of 1 05 to 1.7 being most preferred. The branched poly(3-hydroxyalkanoate) also preferably has an inherent viscosity of 0.2 to 6 at 25° C. on a 0.5 g sample and 100 ml of a 60/40 by weight solution of phenol/tetrachloroethane, more preferably 0.4 to 2.

Novel poly(3-hydroxyalkanoates) are prepared in a novel process comprising contacting a solution containing about 1 to 100 mole percent at least one β-substituted-β-propiolactone containing less than 5,000 ppm water with an anionic initiator under polymerization conditions to produce a poly(3-hydroxyalkanoate).

Applicants have unexpectedly discovered that prior methods of producing low molecular weight poly(3-hydroxybutyrate) which is a specific poly(3-hydroxyalkanoate) were not removing water to a significant extent from the monomer and thus were polymerizing the β-butyrolactone in high concentrations of water. This relatively high concentration of water (above 5,000 ppm) is evidenced by the low production rates and low molecular weight material produced by prior art and the comparative examples that follow. Thus, prior to the present invention, the process of preparing β-substituted poly(3-hydroxyalkanoates) with monomer containing less than 5,000 ppm water was nonexistent. Applicants have unexpectedly discovered an improved process of producing poly(3-hydroxyalkanoates) from a polymerization mixture that among other aspects contains less than 5,000 ppm water. This improved process increases production and molecular weight of the poly(3-hydroxyalkanoates) due mostly to the lower water concentrations during polymerization. The applicants have been able to reduce the amount of water present during polymerization to well below 2000 ppm. The water concentration is preferably less than 1,000 ppm water, more preferable less than 500 ppm with a concentration of water less than 250 ppm being most preferred.

The process of the present invention unexpectedly produces the poly(3-hydroxyalkanoates) at extremely high rates at high molecular weights and improved yields.

The β-substituted-β-propiolactones used in the present invention are manufactured or processed to contain less then 5,000 ppm water preferably by distillation prior to use such that the generation of β-substituted-β-hydroxypropionate is minimized or that the decomposition of β-substituted-β-hydroxypropionate to produce water does not occur.

β-Substituted-β-propiolactones react with water or hydroxide to produce β-hydroxycarboxylic acids. β-Hydroxycarboxylic acids and esters generally, in the presence of proper acid or base catalyst, can undergo elimination of water to produce α,β-unsaturated carboxylic acids or esters. The most frequently used and conventional method to purify β-substituted-β-propiolactones, and in particular β-butyrolactone, involves distillation from calcium hydride drying agents. The present inventors have unexpectedly discovered the generation of water upon distillation of β-substituted-β-propiolactones, and in particular β-butyrolactone, from calcium hydride. It is believed that the water is generated from β-hydroxycarboxylic acids or the salts derived therefrom under what was previously believed to be mild distillation conditions (for β-butyrolactone; 70° C., 20 mm Hg). The present inventors have further discovered that sufficient time or care needs to be taken during the distillative purification of β-substituted-β-propiolactone monomer in order to permit the generation and removal of low boilers (water).

Alternatively, a preferred method of reducing or removing the water in the monomer liquid prior to polymerization can be accomplished by using a selective distillation process. This distillation process entails a center draw of high boilers for use in polymerization from the distillation column with the simultaneous removal and, preferably recycle, of low boilers. This distillation process is preferably continuous.

It is also desirable that residual carboxylic acid content in the monomeric β-substituted-β-propiolactone be minimized. It is believed that traces of carboxylic acids, if present during the polymerization, are capable of hydrogen bonding to the active carboxylate anionic sites (initiator and/or growing chains), thereby slowing the overall rate of polymerization. The number of carboxylic acid equivalents present in the monomer prior to initiation of polymerization is preferably less than 0.5 mole %, more preferably less than 0.1 mole %, even more preferably less than 0.01 mole % with less than 0.001 mole % being most preferred.

In a further process of the present invention the produced polymer, poly(3-hydroxyalkanoate), is precipitated to remove unreacted monomer into the supernatant liquid. This precipitation is preferably conducted by dissolving the preferred poly(3-hydroxyalkanoate), poly(3-hydroxybutyrate) in acetic acid containing up to 60 % water and then the polymer is purified by precipitation into water. Higher amounts of acetic acid (70 % or greater) are more preferred to enhance the solubility of the polymer prior to precipitation. This precipitation additionally serves to remove any catalyst/initiator from the polymer. Monomer can be further removed from the polymer by decomposition by the addition of water or other suitable nucleophile to the polymer or polymer solution preferably in the presence of an acid or base catalyst and at elevated temperatures. The removal of monomer from polymer can be accomplished by more than one decomposition or precipitation step. A further improvement in the process of removing unreacted monomer from polymer entails, prior to precipitation into water, the heating of an aqueous acetic acid solution of poly(3-hydroxybutyrate) to decompose the monomer. This heating is at a temperature preferably between 60° and 140° C. and is preferably conducted for a time of at least one minute but not more than 8 hours.

Blending of this polymer with another polymer can also be conducted prior to the aqueous precipitation process referred to herein above. A preferred polymer that can be blended with the poly(3-hydroxyalkanoate) by precipitative blending is a cellulose ester of a DS 1.7 to 2.8.

In the process of the present invention the β-substituted-β-propiolactones are of the formula:

(IV)

and the resulting polymer is of the formula:

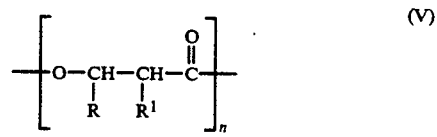

(V)

wherein n is an integer from 10 to 12,000 and R and R¹ are each independently selected from $C_1$ to $C_{20}$ alkyls and substituted alkyls, $C_3$ to $C_{10}$ aryls and substituted aryls, and $C_5$ to $C_{10}$ cycloalkyls and substituted cycloalkyls and wherein $R^1$ can also be hydrogen and is preferably hydrogen. As with formulas (I), (II), and (III), the substituted R and $R^1$ can have up to 4 substituents with each substituent being independently selected from halo, $C_3$–$C_{10}$ aryl, $C_7$–$C_{12}$ arylakyl, $C_1$–$C_{10}$ alkoxy, $C_1$–$C_{10}$ acyl, cyano, $C_1$–$C_{10}$ carboxyalkyl, and $C_2$–$C_{10}$ acyloxy. It is most preferred that (IV) be β-butyrolactone wherein R is methyl and $R^1$ is hydrogen. In some cases, depending on the nature or substitution pattern of (IV), the structural formula (V) overlaps or is included within the formulas (I), (II), and (III). However, it should be noted that structure (V) can be isotactic, syndiotactic, atactic or any combination thereof. Due to the relative ease of synthesis, it is preferred that (V) be isotactic, atactic or any combination thereof.

In one preferred embodiment of the present invention, the process is preferably conducted with optically enriched β-substituted-β-propiolactone to produce at least partially isotactic poly(3-hydroxyalkanoate) containing up to 95% R or S repeat units. The β-substituted-β-propiolactone is preferably at least partially enriched such that one of the two possible enantiomers is present in an enantiomer excess of 30 to 100%, preferably 50 to 80%, with an optical purity of 30 to 70% being most preferred. The presence of small amounts of atactic regions are preferred in the isotactic poly(3-hydroxyalkanoate). The presence of such atactic regions, which result from the use of partially optically enriched β-substituted-β-propiolactone, help to decrease the extent of the crystalline regions and thus improve properties of the polymer. Thus a polymer containing up to 95% R or S repeat units is preferred.

The process of the present invention to produce poly(3-hydroxyalkanoates) is preferably conducted at a temperature of about 0° to 150° C., more preferably 25° to 90° C. with a temperature of 25° to 60° C. being most preferred. At temperatures much below 0° C. the reaction rate, even in the substantial absence of water, is too slow to be very practical whereas temperatures above 150° C. or even much above 120° C. can result in polymer decomposition and uncontrollable reaction rates.

The process of the present invention is conducted in the presence of an anionic initiator preferably at a ratio of initiator to β-substituted-β-propiolactone of 1/25 to 1/12,000 with a ratio of 1/200 to 1/8,000 being more preferred and a ratio of 1/400 to 1/3000 being most preferred.

High amounts of initiators, such as ratios above 1/25 or above 1/200, result in lower molecular weight polymer which often results in undesirable polymer properties such as leaching of oligomer from the polymer sample. Low amounts of initiator (such as 1/12,000) can result in unduly long reaction times, exceptional sensitivity to initiator poison and inhibitors and potentially unacceptable high viscosity buildup during reaction. While high viscosities are generally desirable in the final polymer due to the correlation of viscosity with molecular weight, unduly high viscosities often make processing difficult.

Anionic initiators are preferably chosen from the group of carboxylate anions and the appropriate counterion (cation). Alternatively, non-carboxylate initiators can be used if they are capable of forming carboxylate anions in situ.

Counterions can be chosen from the group of mono to pentavalent cations. Preferred cation (counterions) for the carboxylate initiators are those cations which weakly coordinate to the carboxylate anion, thus permitting the carboxylate anion to be more reactive. The cation of the anionic initiator is preferably selected from the alkaline earth metals, alkali metals, tetrasubstituted ammonium compounds, tetrasubstituted phosphonium compounds, tetrasubstituted arsenic compounds tetrasubstituted antimonium compounds, tetrasubstituted bismuthium compounds, tertiary sulfonium compounds, and the transition metals. For cations which contain substituents, such as tetrasubstituted ammonium compounds, the hydrogen substituent is undesirable. Also undesirable are substituents containing OH, amine N—H, SH, COOH and the like. Generally substituents containing groups which are capable of hydrogen bonding to the carboxylate initiator or growing carboxylate chain are undesirable. It is preferred that the oxidation state of the metal cations be five or less, more preferably less than 3 and most preferably less than 2 (monocations). Suitable examples include the carboxylate salts of potassium and cesium. The alkali metals are more preferably lithium, sodium, rubidium and cesium, even more preferably rubidium and cesium with cesium being most preferred. The most preferred metal carboxylate is a metal acetate such as cesium acetate. Another preferred cation for the anionic initiator is a tetra-substituted ammonium or phosphonium cation, more preferably a tetra-alkyl ammonium salt that is preferably tetra-alkyl ammonium carboxylate with tetrabutylammonium carboxylate being more preferred and tetrabutyammonium acetate being most preferred.

When the process of the present invention is directed toward the synthesis of (II), the initiators will be formed from a salt of the polyacid:

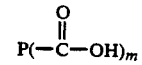

Additionally when the cation of the anionic initiator is chosen from the alkali metals or the alkaline earth metals, the anionic initiator preferably contains a chelating agent capable of complexing to the cation of the anionic initiator. The preferred chelating agent is selected from polyethers that are preferably present at concentrations of at least 1 mole equivalent relative to the cation of the anionic initiator. The preferred polyethers are crown ethers and cryptands. Suitable crown ethers and cryptands can be found in the book *Crown Ethers and Cryptands* by George Gokel. Different crown ethers and cryptands will generally be preferred for different alkali metals and alkaline earth metals. Preferred crown ethers and cryptands include 15-crown-5, 18-crown-6, [2.1.1]-cryptand, 12-crown-4, benzo 15-crown-5, cyclohexano-15-crown-5, benzo-18-crown-6, Z-syn-Z-dicylohexano-18-crown-6, E-anti-E-dicyclohexano-18-crown-6, E-syn-Z-dicylohexano-18-crown-6, dibenzo-18-crown-6, 21-crown-7, 24-crown-8, [2.2.1]-cryptand, [2.2.2]-cryptand, and [3.2.2]-cryptand, with 18-crown-6 being most preferred. Thus a more preferred anionic initiator/chelating agent system is a potassium carboxylate or cesium carboxylate in the presence of 18-crown-6. Some anionic initiators such as the cesium carboxylate and tetraalkylammonium carboxylate function very well without the chelating agent. Even the potassium cation, present in potassium carboxylates like potassium acetate, is capable of initiating polymerization without the benefit of an added chelating agent.

The conjugate acid of the anion of the anionic initiator preferably has a pKa that is at or above 1.5. In the case where the conjugate acid is a polyacid, the last acid has a pKa over 1.5. The preferred pKa for the conjugate acid(s) of the anionic initiators(s) is preferably above 4.

The novel compositions of the present invention can be blended with another compatible polymer. These blends comprise;

(a) 1 to 99 wt. % of at least one atactic poly(3-hydroxyalkanoate) containing stereorandom recurring units of the formula:

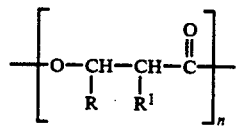

wherein n is an integer from 50 to 10,000, more preferably n is an integer between 700 and 3,000, and R and $R^1$ are each independently selected from $C_1$ to $C_{20}$ alkyls and substituted alkyls, $C_3$ to $C_{10}$ aryls and substituted aryls, and $C_5$ to $C_{10}$ cycloalkyls and substituted cycloalkyls and $R^1$ can also be hydrogen;

(b) about 1 to 99 wt. % of at least one other polymer.

It is preferred that the polymer of (b) above be a compatible polymer that forms a useful blend when combined with (a). It is preferred that these blends of (a) and (b) be miscible, partially miscible, or slightly miscible.

It is preferred that the blends of the present invention be formulated such that they are at least partially biodegradable. Blends of the present poly(3-hydroxyalkanoates) with isotactic poly(3-hydroxyalkanoates) obtained from natural sources are also contemplated.

In one preferred embodiment, component (a) is comprised of at least partially isotactic poly(3-hydroxyalkanoate). This partially isotactic poly(3-hydroxyalkanoate) preferably contains up to 95% R or S repeat units.

As used herein in reference to polymers chosen from group b, the terms "alkyl" and "alkylene" refer to either straight or branched chain moieties such as —CH$_2$—CH$_2$—CH$_2$—CH$_2$— and —CH$_2$CH(X)—CH$_2$—. Also, all of the carbon atoms of the cycloalkyl and cycloalkylene moieties are not necessarily in the ring structure, e.g., a $C_8$ cycloalkyl group can be cyclooctyl or dimethylcyclohexyl. The term "oxyalkylene" refers to alkylene chains containing from 1 to 4 ether oxygen groups.

Suitable compatible polymers preferably include polyethers, cellulose esters, starch and starch esters, polyesters, polyesterethers, polyethers, and polyacrylates.

Preferred polyethers are selected from polyethylene oxide and polypropylene oxide and polytetramethylene oxide. It is preferred that the polyethers have a molecular weight between 200 and 10,000. It is more preferred that the polyethers have a molecular weight between 200 and 4,000. Such polyethers are typically more readily available.

Preferred polyesters are selected from aliphatic polyesters, aromatic polyesters, and aliphatic/aromatic polyesters. The aliphatic aromatic copolyesters are preferably comprised of repeat units of:

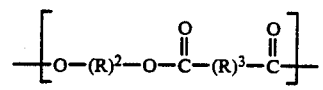

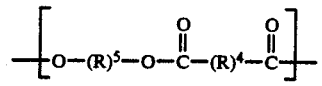

wherein $R^2$ and $R^5$ are selected from one or more of the following groups consisting of $C_2$-$C_{12}$ alkylene or oxyalkylene; $C_2$-$C_{12}$ alkylene or oxyalkylene substituted with one to four substituents independently selected from the group consisting of halo, $C_6$-$C_{10}$ aryl, and $C_1$-$C_4$alkoxy; $C_5$-$C_{10}$ cycloalkylene substituted with one to four substituents independently selected from the group consisting of halo, $C_6$-$C_{10}$aryl, and $C_1$-$C_4$alkoxy; $R^3$ is selected from one or more of the following groups consisting of up to $C_{12}$ alkylene; $C_0$-$C_{12}$ oxyalkylene; $C_0$-$C_{12}$ alkylene or oxyalkylene substituted with one to four substituents independently selected from the group consisting of halo, $C_6$-$C_{10}$ aryl, and $C_1$-$C_4$alkoxy; $C_5$-$C_{10}$cycloalkylene; and $C_5$-$C_{10}$cycloalkylene substituted with one to four substituents independently selected from the group consisting of halo, $C_6$-$C_{10}$ aryl, and $C_1$-$C_4$alkoxy; $R^4$ is selected from one or more of the following groups consisting of $C_6$-$C_{10}$ aryl, $C_6$-$C_{10}$ aryl substituted with one to four substituents independently selected from the group consisting of halo, $C_1$-$C_4$ alkyl, and $C_1$-$C_4$ alkoxy. In a more preferred embodiment the aliphatic-aromatic copolyester $R^2$ and $R^5$ are independently selected from $C_2$-$C_6$alkylene, $C_4$-$C_8$oxyalkylene, and $C_5$-$C_{10}$ cycloalkylene; $R^3$ is selected from $C_1$-$C_4$ alkylene, $C_2$-$C_4$ oxyalkylene, and $C_5$-$C_{10}$ cycloalkylene; $R^4$ is selected from $C_6$-$C_{10}$ aryl.

Alternatively $R^2$ and $R^5$ can be prepolymers selected from the group consisting of polyethyleneglycols, polypropyleneglycols, and polytetramethyleneglycols. Suitable copolyesterethers and methods for their preparation are disclosed in U.S. Pat. No. 4,349,469 the disclosure of which is incorporated herein by reference. The polyethyleneglycols, polypropyleneglycols, and polytetramethylenglycols preferably have molecular weights between 200 and 2,000.

The above aliphatic aromatic copolyesters can be prepared from any polyester comprising a combination or combinations of dicarboxylic acids or derivatives thereof, and diols. The dicarboxylic acids are preferably selected from the group consisting of the following diacids: malonic, succinic, glutaric, adipic, pimelic, azelaic, sebacic, fumaric, 2,2-dimethyl glutaric, suberic, 1,3-cyclopentanedicarboxylic, 1,4-cyclohexanedicarboxylic, 1,3-cyclohexane dicarboxylic, diglycolic, itaconic, maleic, oxalic, 2,5-norbornanedicarboxylic, 1,4-terephthalic, 1,3-terephthalic, 2,6-naphthalene dicarboxylic, 1,5-naphthalene dicarboxylic, and ester forming derivatives thereof, and combinations thereof. The diols are preferably selected from the group consisting of ethylene glycol, diethylene glycol, propylene glycol, 1,3-propanediol, 2,2-dimethyl 1,3-propanediol, 1,3-butanediol, 1,4-butanediol, 1,5-pentanediol, 1,6-hexanediol, 2,2,4-trimethyl 1,6-hexanediol, thiodiethanol, 1,3-cyclohexane-dimethanol, 1,4-cyclohexanedimethanol, 2,2,4,4-tetramethyl-1,3-cyclobutanediol, triethylene glycol, tetraethylene glycol, di-, tri-, tetrapropylene glycol, and combinations thereof.

Suitable preferred aliphatic aromatic copolyesters are selected from the group consisting of poly(ethylene glutarate-co-terephthalate) at 15-70 mole % terephthalate; poly(tetramethylene glutarate-co-terephthalate) at 15-70 mole % terephthalate; poly(tetramethylene glutarate-co-terephthalate-co-diglycolate) at 15-55 mole % terephthalate and 1-10 mole % diglycolate; poly(tetramethylene adipate-co-terephthalate) at 15-70 mole % terephthalate; poly(ethylene adipate-co-terephthalate) at 15-70 mole % terephthalate; poly(tetramethylene succinate-co-terephthalate) at 15-70 mole % terephthalate; poly(ethylene succinate-co-terephthalate)at 15-70 mole % terephthalate poly(ethylene glutarate-co-naphthalene dicarboxylate) at 15-70 mole % naphthalene dicarboxylate; poly(tetramethylene glutarate-co-naphthalene dicarboxylate) at 15-70 mole % naphthalene dicarboxylate; poly(tetramethylene adipate-co-naphthalene dicarboxylate) at 15-70 mole % naphthalene dicarboxylate; poly(ethylene adipate-co-naphthalene dicarboxylate) at 15-70 mole % naphthalene dicarboxylate; poly(tetramethylene succinate-co-naphthalene dicarboxylate) at 15-70 mole % naphthalene dicarboxylate; poly(ethylene succinate-co-naphthalene dicarboxylate) at 15-70 mole % naphthalene dicarboxylate; and poly(ethylene glutarate co-terephthalate) at 15-70 mole % terephthalate.

The aliphatic-aromatic copolyesters preferably have 10 to 1000 repeat units, with repeat units of 15 to 600 being more preferred.

In the aliphatic aromatic copolyesters, the aromatic subunit containing $R^4$ which is:

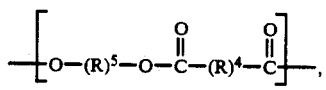

is preferably 5 to 90 mole %, with an amount of 15 to 70 mole % being more preferred.

The blend of the present invention preferably comprises 5 to 95 weight percent poly(3-hydroxyalkanoate) and 5 to 95 weight percent aliphatic-aromatic copolyester. The blend of the present invention when used in molded or extruded articles preferably contains 5 to 30 weight percent poly(3-hydroxyalkanoate) and 70 to 95 weight percent aliphatic aromatic polyester. However, when used in film or fiber applications the blend preferably contains 15 to 50 weight percent poly(3-hydroxyalkanoate) and 50 to 85 weight percent aliphatic-aromatic copolyester.

The compatible aliphatic polyester used in the blends of the present invention is preferably selected from aliphatic polyester having repeat units of the following structure:

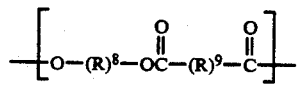

wherein $R^8$ and $R^9$ are each independently selected from $C_2$-$C_{12}$ alkylene, or $C_2$-$C_{12}$ oxyalkylene; $C_2$-$C_{12}$ alkylene or $C_2$-$C_{12}$ oxyalkylene substituted with one to four substituents independently selected from the group consisting of halo, $C_6$-$C_{10}$ aryl, and $C_1$-$C_4$ alkoxy; $C_5$-$C_{10}$ cycloalkylene; $C_5$-$C_{10}$ cycloalkylene substituted with one to four substituents independently selected from the group consisting of halo, $C_6$-$C_{10}$ aryl, and $C_1$-$C_4$ alkoxy. $R^8$ is preferably $C_2$-$C_6$ alkylene, $C_4$-$C_8$ oxyalkylene, or $C_5$-$C_{10}$ cycloalkylene more preferably $C_2$-$C_4$ alkylene or $C_4$-$C_8$ oxyalkylene; and $R^9$ is preferably $C_2$-$C_{10}$ alkylene, $C_2$-$C_4$ oxyalkylene, or $C_5$-$C_{10}$ cycloakylene more preferably $C_2$-$C_4$ alkylene. Alternatively $R^8$ can be prepolymer selected from the group consisting of polyethyleneglycols, polypropyleneglycols, and polytetramethyleneglycols. Suitable copolyesterethers and methods for their preparation are disclosed in U.S. Pat. No. 4,349,469. The polyethyleneglycols and polytetramethylenglycols preferably have molecular weight between 200 and 2,000.

The aliphatic copolyester used in the blends of the present invention preferably have 10 to 1,000 repeat units, with repeat units of 15 to 600 being more preferred.

The above aliphatic polyesters can be prepared from a combination or combination of dicarboxylic acids or derivatives thereof, and diols. The dicarboxylic acids are preferably selected from the group of diacids consisting of malonic, succinic, glutaric, adipic, pimelic, azelaic, sebacic, fumaric, 2,2-dimethyl glutaric, suberic, 1,3-cyclopentanedicarboxylic, 1,4-cyclohexanedicarboxylic, 1,3-cyclohexane dicarboxylic, diglycolic, itaconic, maleic, 2,5-norbornanedicarboxylic, ester forming derivatives thereof, and combinations thereof; and the diols are preferably selected from the group of diols consisting of; the ethylene glycol, propylene glycol, 1,3-propanediol, 2,2-dimethyl 1,3-propanediol, 1,3-butanediol, 1,4-butanediol, 1,5-pentanediol, 1,6-hexanediol, 2,2,4-trimethyl 1,6-hexanediol, thiodiethanol, 1,3-cyclohexanedimethanol, 1,4-cyclohexane dimethanol, 2,2,4,4-tetramethyl-1,3-cyclo butanediol, diethylene glycol, triethylene glycol, tetraethylene glycol, tetra-, tri-, dipropylene glycol and combinations thereof.

The aliphatic polyester is more preferably selected from group consisting of poly(hexamethylene glutarate), poly(hexamethylene adipate), poly(ethylene succinate), poly(butylene glutarate), poly(butylene adipate), poly(butylene succinate), poly(etylene gularate), poly(ethylene adipate), poly(diethylene glutarate), poly(diethylene adipate), poly(diethylene succinate) and poly(hexamethylene succinate).

When the composition that is a blend of (a) and (b) contains an aliphatic polyester as component (b) the components (a) and (b) are preferably present in an amount of about 8 to about 40 wt % (a) and about 60 to about 92 wt % (b); however, when the composition is used to form a molded or extruded object the amounts of components (a) and (b) are preferably present in the range of about 8 to about 20 wt % (a) and about 80 to about 92 wt % (b); and when used to form a film or fiber present in the range of about 20 to about 40 wt % (a) and about 60 to about 80 wt % (b).

The cellulose ester used in the blends of the present invention is preferably a $C_1$-$C_{10}$ ester of cellulose having a DS/AGU of about 1.7 to 3.0 more preferably about 2.1 to 2.85; a Tg of about 85° to 210° C., more preferably about 140° to 180° C.; and an inherent viscosity of about 0.2 to 3.0, more preferably about 0.5 to 1.5, deciliters/gram as measured at a temperature of 25° C. for a 0.5 g sample in 100 ml of a 60/40 parts by weight solution of phenol/tetrachloroethane: This cellulose ester is preferably selected from the group consisting of cellulose acetate, cellulose propionate, cellulose butyrate, cellulose acetate propionate, cellulose acetate butyrate, and cellulose propionate butyrate, more preferably cellulose acetate propionate and cellulose acetate butyrate, with cellulose acetate propionate being most preferred.

A particularly preferred cellulose acetate propionate is one having a DS/AGU of about 2.50 to 2.75 in which the DS/AGU of acetyl ester is from about 4-30 % of the total ester content.

When the composition that is a blend of (a) and (b) contains a cellulose ester as component (b) the components (a) and (b) are preferably present in an amount of about 5 to about 95 wt % (a) and about 5 to 95 wt % (b); more preferably 5 to 40 wt % (a) and 60 to 95 wt % (b), however, when the composition is used to form a film or fiber the amounts of components (a) and (b) are preferably present in the range of about 20 to about 40 wt % (a) and about 60 to about 80 wt % (b).

Another group of compatible polymers useful in the blends of (a) and (b) have the follow structure:

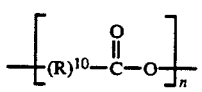

wherein $R^{10}$ is selected from the group consisting of $C_3-C_5$ alkylene or $C_2-C_{12}$ alkylene substituted with one to four substituents independently selected from the group consisting of halo, $C_6-C_{10}$ aryl, and $C_1-C_4$ alkoxy. A more preferred polymer within this group is polycaprolactone.

Another group of compatible polymers useful in the blends of (a) and (b) include polyvinyl acetate, partially hydrolyzed polyvinyl acetate, vinyl acetate-ethylene copolymer, polyvinyl alcohol, polymethyl methacrylate, polyethyl methacrylate, polycarbonate, and hydroxypropyl cellulose.

The blends of components (a) and (b) can be formed into useful coatings, fibers, or shaped articles.

The films can be prepared such as by solvent casting, melt extrusion, or by a blown film process. Examples of uses for films include disposable packaging material, agricultural mulch sheet, bed liners, the film part of a bandage, and diapers, such as the barrer film or outer cover of the diaper, diaper tabs or tape, or film base for diaper fasteners.

Examples of uses for coatings include coatings for controlled or slow release of substances into the environment such as use in the slow release of fertilizers.

Examples of shaped articles include eyeglass frames, toothbrush handles, tool handles, camera parts, razor parts, pen barrels, syringes, shampoo bottles, toys, automotive trim, and packaging materials. A preferred class of articles containing fiber are known as non woven articles. Such non woven articles are used in sanitary napkins, tampons, undergarment liners, and diaper inner liners. The fibers of the blend of (a) and (b) can be prepared by spinning from a solvent or by thermal extrusion and can be round or non round such that the fiber retains a complex cross sectional shape. Other uses of fibers include for example the construction of filter tow, fishing lines, fishnets, or surgical clothing.

The blend composition can be prepared by many different methods that adequately mix components (a) and (b). Suitable examples of mixing include the novel precipitative blends of the present invention as well as casting from a solvent, and thermally compounding. The blends are preferably formed by mixing components (a) and (b) in screw extruder at a temperature of 130°-185° C. with the poly(3-hydroxyalkanoate) preferably introduced into the extruder as a molten liquid.

EXAMPLES

The following examples are set forth to illustrate the present invention but are not intended to limit the reasonable scope thereof.

Proton and carbon nuclear magnetic resonance (NMR) spectra were recorded on a Varian Gemini 300 NMR instrument operating at 300 MHz in proton mode and 75 MHz in carbon mode. Spectra were plotted using Varian version 6.3A software. Proton NMR spectra were typically run at a concentration of 5 to 50 mg experimental compound per gram of solution. Carbon NMR spectra were typically run at a concentration of 50 mg per gram of solution.

Infrared spectra were recorded on a Nicolet 5DX Spectrophotometer and major peak minima are reported in reciprocal centimeters (cm$^{-1}$). This instrument is capable of typical resolutions of less than 4 reciprocal centimeters. Infrared spectra were recorded from films (for oils) or KBr pellets for crystalline materials.

GPC data were acquired on a Waters Model 150C gel permeation chromatograph. The mobile phase was CHCl$_3$ or THF. The molecular weights are reported in polystyrene equivalents.

Water analyses were accomplished by gas chromatography using a HP 5890 instrument equipped with a 25 meter methyl silicon capillary column (J&W Scientific) using hydrogen carrier gas and thermal conductivity detection. The precision of this method may be estimated based on the known precision of this method for determination of water in THF. Thus, through the generation of a calibration curve with known standards in THF, the standard deviation of this water analysis is estimated to be $+/-10$ ppm for a sample containing 100 ppm of water.

(R,S)-$\beta$-butyrolactone was purchased from Aldrich Chemical Company and distilled from calcium hydride (20-30mm Hg, bp ca. 70° C., argon bleed to adjust pressure). Distilled $\beta$-butyrolactone was stored in oven dried laboratory glassware under an argon atmosphere. Prior to use of the monomer, the sealed glassware containing the distilled $\beta$-butyrolactone was stored in a desiccator or polyethylene bag containing calcium sulfate as drying agent. Distilled $\beta$-butyrolactone was typically used within several days of its distillation and was always used within a month of its distillation date. After distillation, all transfers of $\beta$-butyrolactone were made into oven dried glassware using an oven dried cannula and a positive pressure of dry argon or nitrogen.

In polymerization reactions involving 18-crown-6, potassium acetate, or tetrabutylammonium acetate, analytical grade material was purchased from Aldrich and used without any further purification unless otherwise specified. A stream of argon gas was, however, passed over any open glassware containing the above reagents during transfers involving these materials in order to minimize introduction of water into subsequent reactions.

In polymerizations of $\beta$-butyrolactone (BBL) the carboxylate salt functions both as an initiator (the carboxylate portion) and as a catalyst (the counterion and, when present, the counterion complexing agent). Thus as used herein, the terms initiator and/or catalyst are used to refer to the carboxylate salt (and when present the ion complexing agent) and are used interchangeably.

All polymerizations of β-butyrolactone were conducted at ambient pressure under a dry argon or nitrogen atmosphere.

EXAMPLE 1

(R,S)-Poly(3-hydroxybutyrate) made from freshly distilled (R,S)-β-butyrolactone, potassium acetate (KOAC), and 18-crown-6 (1/2000 catalyst to monomer ratio):

A room temperature (ca. 24° C.), oven dried flask was charged sequentially with β-butyrolactone (94.93 g, 1.10 moles), potassium acetate (0.5386 g, 5.49 mmoles), and 18-crown-6 (1.56 g, 5.90 mmoles). Hereinafter this mixture is referred to as solution A. Solution A was used within two hours of its preparation.

A second 300 ml oven dried flask was then charged with freshly distilled β-butyrolactone (87.83g, 1.02 moles) and then was equipped with an oven dried magnetic stirring bar and a thermometer. The water content of the β-butyrolactone was not measured. This stirred reaction vessel was then charged with a portion of solution A (10.32 g, containing 0.59 mmoles of KOAc, final ratio of $KOAC_1$ to BBL ca. 1/2000). There appeared at most only a slight exotherm (to ca. 26° C.) when the catalyst solution A was added. After six days of stirring, the solution was analyzed by NMR and no conversion of monomer could be detected. The magnetically stirred reaction solution was then heated to 60° C. After only one day of heating at 60° C., $^1$H NMR showed about 13% conversion of monomer to polymer. After 27 days of heating at 60° C., no monomer could be detected by $^1$H NMR (<1 %) and heating of the reaction was discontinued. Roughly 2 mole % (relative to hydroxybutyrate subunits) of crotonate end groups were however observed in the proton NMR. This is believed to be an indication of monomer and/or polymer breakdown during reaction. The resulting polymer was not further treated or purified but was instead directly solvent blended with cellulose acetate propionate (CAP 482-20 obtained from Eastman Chemical Company, vide infra, Example 20).

GPC: (THF, uncorrected relative to polystyrene):
Peak molecular weight=19,000
Mn=2700
Mw=9600
Polydispersity=3.5

EXAMPLE 2

(R,S)-Poly(3-hydroxybutyrate) made from freshly distilled (R,S)-β-butyrolactone, potassium acetate, and 18-crown-6 (BBL/KOAc/18-crown-6=200/1/1.04):

A 300-ml oven dried flask was charged with freshly distilled β-butyrolactone (101.69 g, 1.18 moles) and then was equipped with an oven dried magnetic stirring bar and a thermometer. The water content of the β-butyrolactone was not measured. Potassium acetate (0.58 g, 0.0059 moles) and 18-crown-6 (1.63 g, 0.00617 moles) were then sequentially added to the stirred reaction solution. Over a period of 10 minutes without external cooling (with stirring), the reaction temperature rose to 30° C. When the reaction temperature reached 37° C., a room temperature water bath was applied to the external surface of the reaction vessel and the reaction temperature returned to ca. 25° C. Most but not all of the potassium acetate dissolved prior to application of the cooling bath. In approximately 5 hours and 50 minutes (350 minutes) the solution was analyzed by proton NMR which indicated that 68% conversion of monomer to polymer had occurred. After a total of only one day at room temperature, the conversion of monomer to polymer was 93%. In 28 days no monomer could be detected by NMR (<1%). Proton NMR also gave no indication for the presence of crotonate end groups, indicating minimal decomposition during the course of the reaction.

GPC (THF, uncorrected relative to polystyrene (PS):
Peak Molecular Weight=20000
Mn=9930
Mw=14900
Polydispersity=1.5
Tg(DSC, second heating. 20 C/min)=0° C.
Inherent Viscosity
(IV.)=0.26
$^1$H NMR ($CDC_3$, digital resolution=0.18 Hz, line width of TMS at half height=0.71 Hz): 5.32–5.16 (m, 1H), 3.69 (s, 18-crown-6, ca. 187/1 calculated molar ratio of monomer units to 18-crown-6), 2.66–2.54 (m, 1H), 2.47 (dd, J=15.6, 6.1, 0.5H), 2.46 (dd, J=15.5, 6.1, 0.5H), 2.02 (s, acetate end group, ca. 146(+/−100)/1 of monomer units to acetate end groups), 1.28 (d, J=6.1, 1.5H), 1.27 (d, J=6.1, 1.5H).

The detection of two doublets of doublets for the proton at 2.46, 2.47 ppm (methylene proton, one of the protons on the carbon alpha to the carbonyl) and of two doublets for the methyl group at 1.28, 1.27 ppm is assumed to be due to the detection of diad tacticity in the case of the methylene proton and due to incomplete resolution of triad tacticity in the case of the methyl group. That the tacticity is totally random (i.e. atactic or stereorandom polymer) is indicated by the averaged ratio of peak heights for the two methyl groups (low field/high field resonances=0.997) and the averaged ratio of peak heights for the proton at 2.46, 2.47 ppm (low field/high field resonances=0.995).

The resulting polymer was then treated to remove potassium and 18-crown-6. Thus, the crude polymer was dissolved in methylene chloride (1–2L) and filtered through a scintered glass funnel to remove a small amount of particulates (thought to be traces of undissolved potassium acetate). The resulting stirred solution was treated with a high surface area sulfonic acid resin (H+form, 14 g, Amberlyst XN-1010, Aldrich Cat. No. 21,640-2) for 3–4 hours at room temperature. The resulting solution was then slowly filtered through a 3.5 cm ID glass column containing methylene chloride and (from bottom to top) Amberlyst XN 1010 (10.5 g, H+form), Amberlyst XN-1010 (13.6 g, K+form) and Amberlyst XN-1010 (25.6 g, H+form). The eluate was concentrated in vacuo (ca. 4 mm Hg, 30° C., overnight) to provide an extremely viscous clear oil. Except for the absence of the 18-crown-6 peak, the proton NMR was identical to that previously obtained before resin treatment.

GPC (THF, uncorrected relative to Polystyrene (PS))
Peak Molecular Weight=21000
Mn=11600
Mw=15700
Polydispersity=1.4
Tg(DSC, second heating. 20° C./min)=−3° C.
IV.=0.26
Potassium analysis (atomic emission): 3 ppm

EXAMPLE 3

In a repetition of the above experiment in Example 2, careful attention was paid to obtain strictly anhydrous β-butyrolactone (BBL). Thus, from a 1,000 g distillation of β-butyrolactone from calcium hydride, only the last 500 ml of distilled material was collected. GC analysis suggested 288 ppm of water in the lastly distilled β-butyrolactone. Using β-butyrolactone distilled in this fashion, 82% conversion of monomer (proton NMR analysis) was achieved in 5 hours and 40 minutes using the above conditions (30°-33° C., BBL/KOAc/18-crown-6=193/1/1.01).

Caution needs to be taken when polymerizing this very dry BBL. We have recently discovered that when extra care is taken to rigorously remove moisture from distilled β-butyrolactone (i.e. by discarding the first half of the distillate from calcium hydride), vigorous exotherms often result following the addition of our superior catalyst systems to neat BBL, even when using room temperature water (cooling) baths. These vigorous exotherms (up to 100° C. for a 100 g solution using a >1000 g water bath) have been observed up to six hours following the addition of catalyst (potassium acetate/18-crown-6 or tetrabutylammonium carboxylates).

EXAMPLE 4

(R,S)-Polyhydroxybutyrate made from freshly distilled (R,S)-β-butyrolactone and tetrabutylammonium acetate (1/580 catalyst ratio):

A 300-ml oven dried flask was charged with freshly distilled β-butyrolactone (110.93 g, 1.29 moles) and then was equipped with an oven dried magnetic stirring bar and a thermometer. The water content of the β-butyrolactone was not measured. Tetrabutylammonium acetate (0.67 g, 0.00222 moles) was then added. There appeared at most only a slight exotherm (ca. 1.5° C./minute) when the catalyst was added. A water cooling bath was used when the reaction temperature reached 26° C. In approximately 6 hours and 40 minutes (400 minutes), the solution was analyzed by proton NMR which indicated that 42% conversion of monomer to polymer had occurred. After a total of only one day of reaction, the conversion of monomer to polymer was 84%. After a total of 71 days following initiation of the reaction, no monomer could be detected by NMR (<1%). Proton NMR gave no indication for the presence of crotonate end groups, indicating minimal decomposition during the course of the reaction.

GPC (THF, uncorrected relative to Polystyrene (PS):
 Peak Molecular Weight=38,000
 Mn=23,700
 Mw=31,000
 Polydispersity=1.3

GPC ($CHCl_3$, uncorrected relative to Polystyrene (PS):
 Peak Molecular Weight=42,000
 Mn=36,100
 Mw=42,700
 Polydispersity=1.2
 Tg (DSC, second heating. 20 C/min) 4.5
 IV.=0.427

$^1$H NMR ($CDC_3$, digital resolution 0.184 Hz, line width of TMS at half height=0.60 Hz): 5.32-5.16 (m, 1H), 2.66-2.54 (m, 1H), 2.47 (dd, J=15.4, 6.1, 0.5H), 2.46 (dd, J=15.7, 6.1, 0.5H), 2.02 (s, acetate end group, insufficient signal to permit an accurate integral), 1.28 (d, J=6.1, 1.5H), 1.27 (d, J=6.1, 1.5H) (The proton NMR of PHB produced from tetrabutylammonium acetate is judged to be superimposable with the proton NMR obtained for PHB prepared from KOAc/18-crown 6. The tabulated proton NMR is duplicated here to permit a direct comparison with potassium acetate/18-crown-6 prepared material). That the tacticity is totally random (i.e. atactic or stereorandom polymer) is indicated by the averaged ratio of peak heights for the two methyl groups (low field/high field resonances 1.002) and the averaged ratio of peak heights for the proton at 2.46, 2.47 ppm (low field/high field resonances 1.004).

EXAMPLE 5

In a repetition of the above experiment of Example 4, careful attention was paid to obtain strictly anhydrous β-butyrolactone (BBL). Thus, from a 1,000 g distillation of β-butyrolactone from calcium hydride, only the last 500 ml of distilled material was collected. GC analysis suggested 288 ppm of water in the lastly distilled β-butyrolactone. Using β-butyrolactone distilled in this fashion, 69% conversion of monomer (proton NMR analysis) was achieved in six hours and 10 minutes using the above conditions (29°-33° C. BBL/tetrabutylammonium acetate=586/1).

EXAMPLE 6

(R,S)-poly(3-hydroxybutyrate) made from freshly distilled (R,S)-β-butyrolactone and tetrabutylammonium acetate 1/2450 catalyst ratio):

The β-butyrolactone used in this reaction was obtained as a last distillate cut (500 ml) from a ca. 1.25 liter distillation from calcium hydride. Water analysis (gc) revealed 447 ppm of water in the β-butyrolactone used in this reaction.

A 300-ml oven dried flask equipped with an oil filled thermowell was charged with β-butyrolactone (153.6, 1.78 moles) and then Was equipped with an oven dried mechanical stirrer. Tetrabutylammonium acetate (0.219 g, 0.000728 moles) was then added. Over a period of approximately 1 hour the reaction temperature rose to 29° C. (as monitored via a thermocouple in the reactor thermowell). After a total of 395 minutes (reaction still at 29° C. without external cooling or heating), proton NMR analysis indicated the conversion of 40% of the monomer into polymer. The now viscous reaction mixture was left to stir overnight. Overnight the reaction temperature returned to room temperature (23°-24° C.). After a total of 23 hours and 15 minutes, proton NMR analysis indicated 51% conversion of monomer into polymer. Stirring was then ceased. After a total of 37 days, proton NMR analysis indicated 88% conversion of monomer to polymer.

GPC (THF, uncorrected relative to Polystyrene (PS):
 Peak Molecular Weight 149,000
 Mn=84,000
 Mw=111,000
 Polydispersity=1.32

Acetic acid (100 ml) was added to the very viscous polymer sample and two layers resulted. The reaction vessel was placed in a 60° C. sand bath and heated for 3 hours with periodic manual stirring with a spatula at the interface of the two layers. An additional portion of acetic acid was added (25 ml) and the reaction mixture was allowed to cool to room temperature overnight.

The top acetic acid layer was decanted and an additional portion (125 ml) of acetic acid was added to the top of the polymer layer. Heating was continued throughout the day with occasional manual stirring between the two phases. The reaction mixture was once again left to cool to room temperature overnight. The top acetic acid layer was decanted and an additional portion (125 ml) of acetic acid was added to the top of the polymer layer. The reaction vessel was once again heated in a 60° C. sand bath and after approximately 4 hours mechanical stirring was initiated. After a total of 8 hours (for this third acetic acid wash) heating was terminated and the polymer solution/mixture was left to stir overnight. After stirring overnight all of the polymer has dissolved. All acetic acid solutions were combined and charged into a dropping funnel. Additional acetic acid (25 ml) was added to bring the total volume of added acetic acid to 400 ml. This acetic acid solution of polymer was then added dropwise to a mechanically stirred solution of water (1600 ml) at room temperature. After the addition of polymer solution was complete, there resulted a viscous polymer phase under the water/acetic acid solution. Proton NMR analysis (DMSO-d6) of the polymer sample revealed the presence of approximately 2% by weight of β-butyrolactone. The polymer sample was dissolved in 700 ml of acetic acid at room temperature and precipitated as above from 2800 ml of distilled water. This precipitation was repeated a final third time (700 ml acetic acid, 2800 ml H$_2$O). Proton NMR revealed the complete absence of signals for β-butyrolactone. The resulting polymer sample was dissolved in methylene chloride (1200 ml) and a small amount of remaining water was removed by use of a separatory funnel. The methylene chloride phase was washed with water (2×300 ml) and filtered through sodium sulfate. The resulting polymer was concentrated in vacuo (ca. 100 mm Hg and then 1–4 mm Hg) for several days. The resulting polymer was redissolved in methylene chloride (a small amount of acetic acid was detected by proton NMR) and washed with additional portions of water 3×200 ml). The resulting solution was concentrated in vacuo for 3 days. There resulted a clear viscous polymer sample (100.96 g, 66%) which was shown to contain less than 3 weight percent of methylene chloride by proton NMR. The proton NMR was identical with that obtained for the polymer in Example 4, although the singlet attributed to the methyl group of the acetate end group was noticeably smaller in this sample.

GPC (THF, uncorrected relative to Polystyrene (PS):
 Peak Molecular Weight=78,000
 Mn=47,000
 Mw=75,000
 Polydispersity=1.59
 Tg (DSC, second heating 20C/min)=0.4° C.
 Inherent Viscosity: 0.785
 Nitrogen Analysis (Dohrmann): 1 ppm
 (Theory for no catalyst removal=66 ppm)

EXAMPLE 7

(R,S)-Poly(3-hydroxybutyrate) made from freshly distilled (R,S)-β-butyrolactone and tetrabutylammonium salt of 1,2,3-propane tricarboxylate (1/2000 catalyst to monomer ratio, expressed on a molar basis, 1/670 catalyst to monomer ratio expressed on an equivalent basis):

Catalyst Preparation: 1,2,3-Propane-tricarboxylic acid (tricarballylic acid, 75.9 g, obtained from Aldrich) was purified by recrystallization from hot ethyl acetate (750 ml) and isopropanol (200 ml). The resulting solution was allowed to cool to near room temperature and was then filtered away from a brown solid which had precipitated. The resulting filtrate was then concentrated in vacuo to approximately ¼ volume with some resulting solids formation. This suspension was then brought to reflux which caused most but not all of the solids to go into solution. The resulting suspension was then allowed to cool to room temperature and was left to stand overnight. The thus formed crystals were isolated by filtration, washed with ethyl acetate and air dried (49.8g).

A 40 wt % aqueous solution of tetrabutylammonium hydroxide (108.8g, 0.168 moles) was added with stirring to the recrystallized 1,2,3-propane-tricarboxylic acid (10.09 g, 0.0573 moles, 0.172 normal acid equivalents). The resulting solution was allowed to stir overnight prior to filtration to remove a small amount of undissolved solids. The filtrate was frozen, placed on a lyophilizer and brought to constant weight (42.50 g). There was thereby obtained a white hygroscopic solid which was not purified further before using as a catalyst/initiator in the polymerization of β-butyrolactone. All subsequent manipulations of this catalyst were carried out under a dry argon atmosphere.

A 300-ml oven dried flask was charged with freshly distilled β-butyrolactone (114.03 g, 1.3245 moles) and then was equipped with an oven dried mechanical stirrer and a thermometer. The water content of the β-butyrolactone was not measured. The tetrabutylammonium salt of 1,2,3-propane-tricarboxylic acid (0.59 g, 0.000655 moles) was then added with stirring to the reaction vessel. The resulting solution turned slightly cloudy and there appeared to be no sign of any exotherm. The temperature of reaction never exceeded 32° C. After 18 hours and 20 minutes the solution was analyzed by NMR and the conversion of monomer to polymer was 38%. In (49 hours and 50 minutes) the conversion of monomer to polymer was 67%. Stirring of the reaction was stopped after 50 hours due to the high viscosity of the thus formed polymer. After 15 days the conversion of monomer to polymer was 93%.

After six months at room temperature, NMR analysis revealed the complete disappearance of monomer. GPC analysis revealed the presence of 2 peaks. One high molecular weight peak of very narrow polydispersity and one somewhat lower molecular weight peak of broader polydispersity.
 IV=0.63
 1st Peak (GPC, THF)
 Peak Molecular Weight=104,000
 Mn=104,000
 Mw=109,000
 Polydispersity=1.05
 2nd Peak (GPC, THF)
 Peak Molecular Weight=50,000
 Mn=23,000
 Mw=36,000
 Polydispersity=1.6

EXAMPLE 8

(R,S)-Polyhydroxybutyrate made from freshly distilled (R,S)-β-butyrolactone and tetrabutylammonium salt of 1,2,3,4-butane-tetracarboxylate (1/2400 catalyst ratio):

Catalyst preparation: An aqueous solution containing 40 wt % of tetrabutylammonium hydroxide was added with stirring to 1,2,3,4 butane-tetracarboxylic acid (Aldrich). The resulting solution was allowed to stir overnight. This homogeneous solution was then frozen, placed on a lyophilizer and brought to constant weight. There was thereby obtained a white hygroscopic solid which was not purified further before using as a catalyst/initiator in the polymerization of $\beta$-butyrolactone. The water content of this catalyst was not measured. All subsequent manipulations of this catalyst were carried out under a dry argon atmosphere.

A 300-ml oven dried flask was charged with freshly distilled $\beta$-butyrolactone (155.30 g, 1.8039 moles) and then was equipped with an oven dried mechanical stirrer and a thermometer. A water content of 288 ppm in this $\beta$-butyrolactone was suggested by gc analysis. The tetrabutylammonium salt of 1,2,3,4-butane-tetracarboxylate (0.87 g, 0.0007474 moles) was then added with stirring to the reaction mixture. To avoid the possibility of an uncontrolled exotherm, an air piston driven jack containing a 0° C. cooling bath was utilized to cool the reaction when the reaction temperature reached 32.5° C. As the reaction temperature then dropped, the jack was then removed from the vicinity of the reaction vessel to prevent excessive cooling. Thus, the temperature of the reaction was held at a constant temperature of ca. 30°-33° C. throughout the day. In approximately 5 hours (300 minutes) the solution was analyzed by proton NMR and the conversion of monomer to polymer was determined to be 57%. Stirring of the reaction mixture was discontinued approximately 6 hours after the addition of catalyst/initiator. After a total of 17 days, NMR analysis indicated only 1% of monomer remained.

After six months at room temperature, NMR analysis revealed the complete disappearance of monomer. GPC analysis revealed the presence of 2 peaks, one high molecular weight peak of very narrow polydispersity and one somewhat lower molecular weight peak of broader polydispersity.

IV.=0.701
1st Peak (GPC, THF)
Peak Molecular Weight=139,000
Mn=128,000
Mw=137,000
Polydispersity=1.07
2nd Peak (GPC, THF)
Peak Molecular Weight=46,000
M(n)=25,000
M(w)=36,000
Polydispersity=1.45

EXAMPLE 9

(S)-Poly(3-hydroxybutyrate) made from freshly distilled (S)-$\beta$-butyrolactone and tetrabutylammonium acetate (299/1):

(S)-$\beta$-butyrolactone was prepared according to the method of Seebach (R. Breitschuh, D. Seebach, *Chimia*, 44, 216 (1991).

A 25 ml oven dried flask was charged with freshly distilled (S)-$\beta$-butyrolactone (5 ml, 5.28 g, 0.0613 moles) and then was equipped with an oven dried magnetic stirring bar and a thermometer. The water content of the (S)-$\beta$-butyrolactone was not measured. Tetrabutylammonium acetate (0.02930 g, 0.0000972 moles) was then added. There appeared to be no sign of any exotherm when the catalyst was added. After one day at room temperature, the reaction solution was analyzed by NMR and there was no detection of polymer. More tetrabutylammonium acetate (0.0325 g, 0.0001078 moles) was then added. After six days there was still no detection of polymer in the reaction. The reaction was left stirring over the weekend and when next examined (after a total of 13 days) the reaction mixture had solidified into white solids. Stirring of the reaction mixture ceased sometime between 6 and 13 days. After a total of 13 days of reaction, proton NMR analysis of the reaction mixture indicated that 28% conversion of the monomer to a crystalline polymer had occurred. The proton NMR of this polymer was superimposible on the proton of NMR of natural polymer obtained from biological sources (Aldrich).

EXAMPLE 10

(R,S)-Poly(3-hydroxybutyrate) made from freshly distilled (R,S)-$\beta$-butyrolactone and cesium acetate (1/195 catalyst ratio):

$\beta$-Butyrolactone (111.31 g, 1.29 moles) and cesium acetate (1.27 g, 0.00662 moles) were charged to a room temperature 300 ml oven dried flask which was equipped with a thermometer and a magnetic stirring bar. The water content of the $\beta$-butyrolactone was not measured. The reaction mixture was then heated at 60° C. over the weekend. After three days of reaction at 60° C., proton NMR analysis indicated 85% conversion of monomer to polymer.

EXAMPLE 11

This example demonstrates the unexpected generation of water during the distillation of $\beta$-butyrolactone.

A two liter, 1-neck flask was charged with $\beta$-butyrolactone (1 kg, Aldrich Lot #05627PD) and calcium hydride (14.07 g,—1 to 4 mesh) under an argon atmosphere. The resulting suspension was left to stir overnight. The following morning a 1 ft. vigreux column and a vacuum compatible distillation take off head was attached to the two liter flask containing the $\beta$-butyrolactone and calcium hydride. The internal pressure in the distillation flask was brought to 25 mm Hg using a vacuum pump with an argon bleed which permitted upward adjustment of the pressure. The distillation flask was vigorously stirred with heating and distillation commenced at a head temperature of 70° C. After distillation of the first approximately 40 ml of $\beta$-butyrolactone (F1), the first collection vessel was replaced to allow collection of a second fraction (F2). There resulted shortly thereafter the observation that a second liquid was condensing around the top ring of the water cooled condenser while the major liquid (presumed to be $\beta$-butyrolactone) continued to condense around the bottom ring of the condenser. This second presumably lower boiling liquid was observed to be sparingly soluble in the higher boiling component ($\beta$-butyrolactone). Both liquids were drawn off into the distillation receiver. Simultaneous with the generation of this apparent lower boiling component there was observed a vigorous frothing of the components in the half-filled distillation vessel. The internal pressure in the distillation apparatus was observed to rise to approximately 40 mm Hg after which the pressure slowly declined over a period of several minutes back to the 25 mm set point. This temporary rise in pressure served to moderate the vigorous frothing which was observed in the distillation vessel. After approximately 5 minutes all evidence for the generation of a second lower boiling component had ceased and the two liquids phases which had been initially observed in the distillation receiver had become homogeneous. Distillation was continued until approximately 250 ml of liquid had been collected (F2). A final 500 ml of distillate was then collected (F3).

Gas chromatographic analysis (GC) of all distillate fractions revealed that the major component was $\beta$-butyrolactone. GC analysis of the distillate fractions for water revealed the following results.

F1: (40 ml) 551 ppm $H_2O$
F2: (250 ml) 1347 ppm $H_2O$
F3: (500 ml) 310 ppm $H_2O$ The above procedure was repeated using 21.26 g of calcium hydride and provided the following results:

F1: (30 ml) not analyzed for water
F2: (200 ml) 4881 ppm $H_2O$
F3: (500 ml) 288 ppm $H_2O$

EXAMPLE 12

This example demonstrates the effect of heating and water content on the decomposition of $\beta$-butyrolactone in acetic acid.

A 50 ml volume of the indicated acetic acid/water solvent system was brought to the indicated temperature (generally reflux). A 5 ml sample of $\beta$-butyrolactone was then added in one portion. The resulting stirred solution was then heated for the indicated time prior to proton NMR analysis for the reaction products. The results are presented in Table 1.

TABLE 1

| Decomposition of $\beta$-Butyrolactone | | | |
|---|---|---|---|
| % Water in HOAc | Time (min) | Temp (C.) | % Decomp |
| 0 | 40 | 118 | 25 |
| 10 | 40 | 110 | 60 |
| 30 | 40 | 105 | 90 |
| 10 | 300 | 110 | 100 |
| 10 | 300 | 25 | 0 |

EXAMPLE 13

This example demonstrates the removal of $\beta$-butyrolactone from atactic polyhydroxybutyrate by precipitation of the polymer into water.

A partially polymerized sample of (R,S)-$\beta$-butyrolactone was analyzed by proton NMR and was found to contain 62% $\beta$-butyrolactone (38% poly(3-hydroxybutyrate)). A 10 ml volume of this partially polymerized sample was added by dropwise addition to a solution containing 20% acetic acid in water (v/v, 90 ml). The resulting precipitate was then dissolved in acetic acid (10 ml) and added by dropwise addition to a solution containing 10% acetic acid in water (90 ml). The resulting precipitate was again dissolved in acetic acid (10 ml) and precipitated by dropwise addition to a stirred solution containing 10% acetic acid in water (90 ml). Each precipitate was analyzed for $\beta$-butyrolactone content by proton NMR (DMSO-$d_6$) and the results are presented in Table 2.

TABLE 2

| Precipitation of PHB | |
|---|---|
| Number of PPT from Aqueous HOAc (80% Water) | % BBL |
| 0 | 62 |
| 1 | 13 |
| 2 | <1 |

TABLE 2-continued

| Precipitation of PHB | |
|---|---|
| Number of PPT from Aqueous HOAc (80% Water) | % BBL |
| 3 | 0 |

The above three precipitations were repeated without analysis of any of the intermediate precipitates in order to maximize yield. Thus, from an initial 11.03 g of poly(3-hydroxybutyrate) in $\beta$-butyrolactone (62%), there was obtained after 3 precipitations into acetic acid/water (20/80) a purified polymer sample. No residual monomer could be detected in the final precipitate. This final precipitate was dissolved in methylene chloride and filtered through sodium sulfate. The resulting solution was concentrated in vacuo (1–4 mm Hg) for several days to provide the colorless polymer sample (3.68 g, ca. 88% recovery based on the initial NMR analysis). The proton NMR spectra of this sample were identical with those obtained for Example 4 and indicated the presence of less than 2 weight percent of methylene chloride.

GPC (THF, uncorrected relative to Polystyrene (PS)
Peak Molecular Weight=21,000
Mn=16,000
Mw=19,000
Polydispersity=1.18

EXAMPLE 14

This example demonstrates the ability to recover poly(3-hydroxybutyrate) without significant decomposition (molecular weight change) while treating the crude polymer under conditions which decompose monomer.

A solution of 70% acetic acid in water (100 ml) was brought to reflux through the use of heating mantle applied externally to the reaction vessel (300 ml/3-neck flask). To this vigorously stirred solution was added the polymer sample (10 ml) containing 62% of $\beta$-butyrolactone monomer which had been used in the Example 13. Reflux was maintained for 30 minutes at a pot temperature of 104° C. after the addition of polymer. The heating mantle was then removed from the reaction vessel, thus permitting the reaction mixture to rapidly return to room temperature.

The above cooled reaction solution was placed in a dropping funnel and precipitated by dropwise addition into a magnetically stirred solution of distilled water (350 ml). The resulting precipitate was shown to contain less than 2% of $\beta$-butyrolactone by proton NMR analysis.

GPC (THF, uncorrected relative to Polystyrene (PS)
Peak Molecular Weight=20,000
Mn=11,000
Nw=14,000
Polydispersity=1.30

EXAMPLE 15

This example demonstrates the detrimental effect of water on the polymerization rate of $\beta$-butyrolactone.

The $\beta$-butyrolactone used in these reactions was obtained as a last distillate cut (500 ml) from a one liter distillation from calcium hydride (70° C., 30 mm Hg). Water analysis revealed 176 ppm of water in this distilled $\beta$-butyrolactone.

A 300 ml oven dried flask equipped with an oil filled thermowell was charged with $\beta$-butyrolactone (144.25 g, 1.6756 moles) and then was equipped with an oven dried mechanical stirrer. Tetrabutylammonium acetate (0.86 g, 0.00285 moles) was then added with stirring at room temperature. The reaction was allowed to warm to 32° C. (ca. 10-20 minutes) The reaction temperature was then maintained between 29° and 33° C. using a temperature actuated cooling bath (0° C.). After a total of 195 minutes, a drop of the reaction mixture was diluted with 1 ml of chloroform and immediately analyzed by proton NMR for percent conversion of monomer (reported conversion taken as the average of the polymer and monomer methine, methylene, and methyl area ratios).

The above procedure was then repeated on two sequential days with the same sample of distilled β-butyrolactone but with the addition of small amounts of water to the β-butyrolactone prior to catalyst addition. The results are presented in Table 3.

TABLE 3

Detrimental Effect of Added Water to Polymerization Rate

| Catalyst/Monomer | Water (ppm) | Reaction Temp. °C. | % Conversion | Time (min) |
|---|---|---|---|---|
| 1/587 | 176* | 19-33 | 81 | 195 |
| 1/578 | 856** | 29-32 | 48 | 197 |
| 1/522 | 2790*** | 21-25**** | 8 | 200 |
| | | | 14 | 380 |
| | | | 43 | 1335 |

*Water content determined by gc analysis
**Prepared by addition of 100 μl of water to 146.98 g of β-butyrolactone containing 176 ppm of water.
***Prepared by addition of 400 μl of water to 152.85 g of β-butyrolactone containing 176 ppm of water.
****The upper limit for the temperature of these reactions was controlled using a temperature actuated cooling (0° C.) bath. This reaction was not sufficiently exothermic to actuate the bath.

EXAMPLE 16

A number of additional experiments were conducted according to the general procedure described in Example 15. These experiments demonstrate the ability of different initiators and different initiator concentrations to successfully induce polymerization of β-butyrolactone at low water concentrations. The results are summarized in Table 4. Some of the previously described examples are also presented in this Table for comparison.

TABLE 4

| Catalyst/Initiator | Initiator/* Monomer | GC Water Content In Water | Time | % Conversion NMR | Calc.** MWT. |
|---|---|---|---|---|---|
| a (Ex. 8) | 1/2400 | 228 ppm | 300 min | 57 | 210,000 |
| b (Ex. 3) | 1/193 | 228 ppm | 340 min | 82 | 17,000 |
| c (Ex. 5) | 1/586 | 288 ppm | 370 min | 69 | 50,000 |
| c | 1/590 | 447 ppm | 219 min | 84 | 51,000 |
| c (Table 3) | 1/587 | 176 ppm | 195 min | 81 | 50,000 |
| c | 1/1292 | 447 ppm | 405 min | 68 | 100,000 |
| c*** (Ex. 6) | 1/2450 | 447 ppm | 395 min | 40 | 211,000 |
| d | 1/1050 | 228 ppm | 300 min | 6 | 90,000 | a = tetrabutylammonium tetra-salt of 1,2,3,4-butane-tetracarboxylic acid
b = potassium acetate/18-crown-6
c = tetrabutylammonium acetate (no attempt was made to dry the catalyst after purchase (Aldrich)
d = tetrabutylphosphonium acetate (hygroscopic oil which was believed to be wet)
*molar basis
**calculated from monomer to initiator ratio
Except in the noted cases, all reactions were run in bulk (90-160 g scale) under dry nitrogen, with mechanical stirring and with the exotherm controlled at 29-33° C. through the use of a temperature actuated 0° C. cooling bath.
***After an initial warming period (ca. 60 minutes) this reaction was carried out in bulk at a constant 29° C.

The preceeding examples demonstrate that atactic or isotactic poly(3-hydroxybutyrate) can be readily prepared with molecular weights up to 150,000 (peak molecular weight) from the ring opening polymerization of β-butyrolactone. Typically, reaction times are shown to be significantly less than one day (24 hours). The preceding examples additionally demonstrate the extreme water sensitivity for the anionic ring opening polymerization of β-butyrolactone. High molecular weight polymer and/or reasonable reaction rates of under one day were only obtained in the relative absence of water. Also demonstrated is the ease with which either linear or branched or star shaped polymers can be prepared based upon the choice of initiator used in the polymerization of β-butyrolactone. These examples additionally teach the removal of monomer by precipitation of the polymer into water and/or the decomposition of monomer in aqueous acetic acid.

The following four examples illustrate the preparation of blends of poly(3-hydroxybutyrate) and cellulose esters.

In addition to the novel precipitative blends described in Example 17-19, physical mixing of the components to form a blend can be accomplished in a number of ways such as mixing the components in the appropriate solvent (e.g., acetone, THF, CH2Cl2/MeOH, CHCl3, dioxane, DMF, DMSO, AcOH, AcOMe, AcOEt, pyridine) followed by film casting or fiber extrusion. The blend components can also be mixed by thermally compounding. The most preferred method is by thermally compounding in an apparatus such as a torque rheometer, a single screw extruder, or a twin screw extruder. The blends produced by thermally compounding can be converted to thin films by a number of methods known to those skilled in the art. For example, thin films can be formed by discoating as described in U.S. Pat. No. 4,372,311, by compression molding as described in U.S. Pat. No. 4,427,614, by melt extrusion as described in U.S. Pat. No. 4,880,592, by melt blowing, or by other similar methods. The blends can be converted to molded plastic objects by injection molding as well as by extrusion into sheet from which an object is cut or stamped. The thermally compounded blends can be used for melt extrusion of fiber as well.

EXAMPLE 17

A solution of 42.09 grams of cellulose acetate propionate (DS(OPr)=2.65 and DS(OAc)=0.1) dissolved in 250 milliters of methylene chloride was combined with a solution of 28.46 grams of atactic poly(3-hydroxybutyrate) prepared according to the present invention, (Mw=32,000, Mn=23,000) in 100 ml of methylene chloride. The resulting clear solution was precipitated into warm water (80° C.) and filtered. The white precipitate was washed well with hot water and dried in vacuo at 60° C. Differential Scanning Calorimetry (DSC) analysis of the precipitated flake shows a single strong glass transition temperature Tg at 77° C. and a melting temperature (Tm) at 161° C. The dry precipitate was transferred to a torque rheometer heated at 180° C. and thermally blended for 5 minutes at 40 rpm blade speed. This blend was ground to 5 mm particle size and pressed between two metal plates at 180° C. Physical properties of the films were as follows:

Tangent Modules $0.57 \times 10^5$ psi
Break at Elongation 53%
Tensile Strength $3.06 \times 10^3$ psi
Tear Strength 17.0 g/ml Gell permeation chromatography (GPC) in THF shows two peaks; one with a weight average molecular weight Mw=228,000 and another of Mw=39,000.

EXAMPLE 18

A solution of 8.0 grams of cellulose acetate propionate (DS(OPr)=2.65 and DS(OAc)=0.1) in 150 mls of propionic acid was combined with a solution of 2.0 grams of atactic poly(hydroxbutyrate) prepared according to the present invention in 50 mls of acetic acid to form a clear solution. The solvent blend was then precipitated into 2 liters of cold water. The resulting white precipitate was filtered and washed well with hot water. Analysis of the precipitate by DSC shows a single strong Tg at approximately 94° C. and a Tm at 165° C.

EXAMPLE 19

A solution of 40.12 grams of cellulose acetate propionate (degree of substitution propionyl is 2.65 and acetyl is 0.10) dissolved in 300 mls of propionic acid was combined with a solution of 41.5 grams of atactic poly(hydroxybutyric acid) prepared according to the presentation (Mw=3.1 $\times 10^5$) dissolved in 200 mls of propionic acid at room temperature. The resulting clear solution was precipitated into 10 liters of water and flake precipitated. The precipitate was washed well with water and dried under vacuum at 80° C. Differential scanning calorimetry show a single strong Tg at 57° C. and a Tm at 155° C.

With the exception of the novel precipitative blending described herein and above, blends and films are prepared by two general methods: (i) the blend components are shaken together before compounding at the appropriate temperature in a Rheometrics Mechanical Spectrometer. The resulting resin is typically ground to 5 mm particle size and a portion is pressed between two metal plates at a temperature above the melt temperature of the resin (typically at 180° C.) to form a melt pressed film; (ii) blends of the cellulose ester and polyhydroxybutyrate were prepared by dissolving the blend components, premixed at the desired levels, in 9/1 (v/v) CHCl3/MeOH to give a 20% (w/v) solution. Films were prepared by pulling down a portion of the solution on a glass plate using a 15 to 30 mm draw blade. The films were allowed to air dry overnight before drying to a constant weight, in a vacuum oven at 40° C.

The tensile strength, break to elongation, and tangent modulus of the films are measured by ASTM method D882; the tear force is measured by ASTM method D1938; the water vapor transmission rates are measured by ASTM method F372. Inherent viscosities are measured at a temperature of 25° C. for a 0.5 gram sample in 100 ml of a 60/40 by weight solution of phenol/tetrachloroethane. Dynamic mechanical thermal analysis (DMTA) spectra were collected using a Polymer Laboratories Mk II at 4° C./min and 1 Hz.

EXAMPLE 20

The cellulose acetate propionate (CAP 482-20) used in the example is a commercial product sold by Eastman Chemical Company.

In a 300 ml round bottom flask, 16.0 grams of poly(hydroxybutyric acid) prepared as in Example 1 and 24.0 grams of cellulose acetate propionate CAP 482-20, degree of substitution propionyl is 2.7, and acetyl is 0.1) were dissolved in 160 mls of 9/1 chloroform/methanol at room temperature. The resulting clear solution was cast onto glass plates and the solvent allowed to slowly evaporate. This film was used in the composting study which is summarized in Table 5.

Composting Studies—The following example provides a description of general procedures used in composting.

EXAMPLE 21

Composting can be defined as the accelerated natural degradative process that results from putting organic matter in piles or heads to conserve metabolic heat; it entails the biologically mediated aerobic decomposition of organic material to form $CO_2$, $H_2O$, biomass, heat, and humus.

Composting recipe: The recipe for the synthetic waste that was used in the bench scale compost units consisted of purina rabbit chow (4,000 g), cow manure (1,000 g) garden soil (1,700 g), finely shredded newspapers (2,667 g), calcium carbonate (300 g), sodium bicarbonate (20 g) and water (10 liters). Ingredients were mixed by a Hobart mixer until a uniform particle size (1–3 mm) was obtained. The final mixture had a 55% moisture content and a pH of 6.8. Each compost cylinder received approximately 7500 grams of the synthetic waste formula, which filled the container completely. The film samples (1×16 cm) were uniformly dispersed throughout the mixture.

Compost Unit Design & Control System: Bench scale compost units were constructed from 11" diameter stainless steel piping. The cylinders were 17" in height,—with approximately 2" of headspace at the top and bottom. A fine mesh stainless steel screen was inserted at the interface between the compost and the headspace to facilitate air diffusion. In addition, the screens also prevented the compost from obstructing the air inlet and outlet ports. The units were sealed with gas tight lids, permitting total gas collection via the vent port. The internal surfaces of the compost unit were fitted with 4 baffles (13"×1") which enhanced the efficiency of mixing. Each cylinder had a thermocouple probe inserted in the bottom third; this was connected to a Yokogawa temperature monitor which recorded the continuous temperature output of eleven individual compost units. Forced air entered the unit through the primary inlet port, located at the bottom of the cylinder, and was shunted into the headspace. During the entire 15 day composting cycle, the primary air supply was fed continuously, delivering approximately 2,000 mls/min. When the metabolic heat caused the compost temperature to reach 55° C., it actuated a relay in the Yokogawa monitor. The relay in turn controlled a solenoid valve which permitted an additional 3,000 mls/min of air flow into the secondary air inlet. All eleven compost units were controlled independently. When the temperature fell below 50° C., the secondary air supply was immediately shut off. Due to the high air flows which were required during the thermophilic phase, it was necessary to have both the primary and secondary air streams flow through a water trap (to humidify the air) prior to its entry into the cylinder.

Percent Moisture Determinations: Samples of compost were taken daily and added to pre-tared pans; these were dried at 105° C. until a constant weight was obtained. The average sample, approximately 10 grams, required at least 14 hours for drying. The percent water, and a dry weight correction factor were calculated daily.

Compost Dry Weight Loss Determinations: At the beginning of each experiment, a tare weight was determined for each individual compost unit. During an experiment, each compost unit was weighed daily on a Metler PM 3000 top loading balance. The total weight minus the tare weight being equal to the amount of compost on a wet weight basis. To insure accuracy, all samples which were removed for moisture analysis or pH were weighed; these values were added back to the previous day's total weight. The percentage dry weight multiplied by the net wet weight yielded total dry weight.

Film Weights: Film samples were dried in a vacuum oven held at 30° C. (under a low stream of dry N2) until a constant weight was obtained. Due to the low temperature limits imposed by certain films, a desiccant was added to facilitate drying. Many of the films possessed hygroscopic components which retained water, consequently 3 to 4 days of drying were required before a constant weight could be obtained.

Compost pH: Approximately 25 grams of compost were collected daily for pH determinations. To each sample, 40–50 mls of distilled water were added. Samples were allowed to sit for 30 minutes with periodic stirring to facilitate mixing. After 30 minutes, the entire contents of the container were poured through 4 layers of cheese cloth to remove all large particles. The precaution of filtering was necessary to insure that no interference with the pH probe occurred. The pH of the extract was then taken with an Orion model 611 pH meter.

Film washing: Following the 15 day compost cycle, films were washed for 30 minutes. in a neutral detergent solution held at 50° C. for one hour. The detergent was removed by extensive (4–6) distilled water rinses. Films were air dried, and then placed in a vacuum oven as described above.

Carbon, and Nitrogen Determinations: Percent C, H, and N were determined on finely ground compost.

Statistical Design: A maximum of eleven different types of films could be evaluated during a single compost trial, with each compost unit receiving only one of the eleven test types. Each individual compost cylinder received the following: 15 replicate test films, 10 replicate starch containing blends (Matter Bi ™ Navamont, Int'l (internal positive control), and 5 replicate Polyethylene films (negative control). Following the 15 day compost cycle, all films were harvested and processed in the manner previously described. Following the washing and drying steps, a net percent weight change was calculated for each individual film sample.

All internal control films (starch containing polymer Matter Bi ™) were first segregated by individual compost units and statistically analyzed to insure that no unit to unit bias existed. This was accomplished by an analysis of variance using the General Linear Method (GLM) of SAS, in conjunction with a Duncan's Multiple Range Test of the individual compost unit means at the 95% confidence level. The GLM model was PERCENT= UNIT, where PERCENT=the percent weight loss of the starch containing polymer films (internal controls) after 15 days, and UNIT=the individual compost cylinder. If this analysis revealed that there was no statistical difference between units, with regard to the degradation of the internal positive control, it was then statistically valid to further analyze and compare the test films across different compost units. All test films were sorted by film type prior to conducting the GLM analysis of variance. The model used was PERCENT=FILM, where PERCENT=the percent weight loss of each film type after 15 days, and FILM-=either starch containing polymer, polyethylene, or cellulose-acetate-propionate/poly-B-hydroxybutyrate.

RESULTS AND DISCUSSION

Bench scale compost units were designed to emulate a municipal windrow composting operation, equipped with forced aeration for temperature regulation. A comparison of moisture content, temperature profiles, pH changes, and compost dry weight loss over 15 days, demonstrated that the bench scale units were functioning in a manner analogous to their full scale municipal counterparts. At the start of the experiment the moisture content was adjusted to 60%, it dropped slightly during the thermophilic phase which required higher air flows which had a tendency to dry the compost. After five days the system started to actually produce water, a by product of metabolism. The smaller units demonstrated excellent self heating ability, with temperatures of 55°–65° C. being reached within 2–3 days. Unfortunately, the microbial ecosystem within a compost pile has an inherent tendency to self limit itself by the excessive accumulation of metabolically generated heat. The threshold for significant inhibition is approximately 60° C., and inhibition sharply rises at higher temperatures. Unless controlled through deliberate heat removal, composting masses typically peak at 80° C., at which point the rate of decomposition is extremely low. High volume solid waste management systems can not afford to have the degradation process operate at low efficiencies, due to the relatively short time frame they are operating within. Thus, this self-limiting tendency must be aggressively countered if microbial decomposition is to be encouraged. Consequently, the central problem in the design and control of municipal composting facilities is heat removal, with an operational ceiling held near 60° C. Forced aeration has been shown to be a very effective means of removing heat. Since approximately nine times more air is required to remove heat than to supply the metabolic $O_2$ for aerobic respiration, these systems do not suffer from oxygen limitations. The desired operational temperature ceiling for the bench scale units used in this study was between 55°–60° C. The control system maintained adequate control against deleterious temperatures.

Municipal systems have to handle, process, and reduce large volumes of waste in a short time frame so that they can meet new incoming loads. The bench scale compost units were able to cause a 42% loss in dry weight of the starting synthetic waste mixture—denoting excellent degradative efficiency. The carbon to nitrogen (C:N) ratios of the starting waste were typically lower for the bench scale units than would be experienced in most municipal waste streams. Compost used in the bench scale units started with C:N ratios in the range of 25:1, whereas most municipalities deal with waste streams that have C:N in excess of 30:1.

The compost also under went macroscopic changes during the 15 days. The final product was much darker than the starting material, and it had an odor which was very characteristic of fresh soil. These changes are also consistent with the final product that municipal compost units produce.

Since each compost cylinder represents a single experiment and each trial represents eleven experiments, there was an important need to document the efficiency of each unit with reference to an internal standard. If unit to unit variation exists, conclusions made regarding differences between test films would not be valid. This obstacle was overcome by the use of starch containing polymer films as an internal control for each compost cylinder. If these control films degraded to the same extent in all eleven compost units, then it was statistically valid to compare and contrast the different test films across or between units. Use of control films also permits a historical comparison of films evaluated in separate composting trials.

EXAMPLE 22

Three films; starch containing polymer (Matter-Bi TM), polyethylene films, and the experimental polymer blend produced in Example 20 (40 wt % synthetic, atactic poly(3-hydroxybutyrate) and 60 wt % CAP 482-20) were submitted to the composting conditions described in Example 21.

The mean percent weight loss for cellulose acetate propionate/poly-p-hydroxybutyrate, starch containing polymer, and polyethylene films are summarized in Table 5. All three film types are statistically different from one another at the 90% confidence level. Although the starch containing polymer films yielded the most weight loss, the rigid starch component of these films degraded preferentially, leaving behind a very flexible polymer. These composting studies indicate that these films will not pass through the final screens at most municipal compost facilities. The cellulose acetate propionate/poly-$\beta$hydroxybutyrate films lost an average of 24% of their original weight. These films were noticeably less flexible and were easily torn. The polyethylene films were completely recalcitrant to all microbial degradation these films actually gained a small amount of weight which probably represents organic matter that had adsorbed to the films surface.

TABLE 5

| Film Weight Loss After 15 Days in Bench Scale Compost Units | | |
|---|---|---|
| Film Type | Sample Replications | Percent Weight Loss |
| Starch Containing Blend | 115 | 52.0 ± 2.4 |
| Experimental Blends: CAP 482-20/Poly (3-Hydroxybutyrate) (60/40) | 15 | 24.5 ± 9.5 |
| Polyethylene | 15 | −0.9 ± 1.2 |

To further substantiate that the weight loss for the blend of PHB/CAP 482-20 (40/60) was due to the PHB component, a series of 14 composted films and 3 precomposting films were analyzed by proton NMR (CDCl$_3$). The results of this NMR analysis are presented in Table 6. The relative amount of CAP 482-20 was calculated from the area contribution of carbohydrate CH and CH2 protons. The degree of substitution could then be calculated from the propionyl region (methyl) of the NMR. Based on NMR and hydrolysis methods the DS of acetate in CAP 482-20 was previously known to the approximately 0.1. The relative amount of PHB was conveniently calculated from the area contribution of the PHB methyl group.

TABLE 6

| Ratio of PHB to CAP 482-20 in a 40/60 Blend Before and After Composting | | |
|---|---|---|
| Sample | NMR Determined Total DS* for CAP Component | Percent PHB in Blend (NMR) |
| Before Composting | 2.85 +/− 0.006** | 42.2 +/− 0.23 |
| After | 2.87 +/− 0.068 | 29.12 +/− 7.5 |

*The DS of propionyl was determined directly from the NMR integral. It was then assumed that the acetyl DS was 0.1. Thus, total DS = propionyl DS + 0.1.
**Error is expressed as one standard deviation.

EXAMPLE 23

This example, though the use of a radiolable study, demonstrates that CAP 482-20 (used in the experimental blend of Table 5) does not undergo significant degradation (composting) in the absence of atactic poly(3-hydroxybutyrate).

Radiochemistry: Activated sludge from the Tennessee Eastman Chemical Company's wastewater treatment system served as the starting inoculum for the establishment of the stable CA degrading enrichment cultures used in this invention. Cellulose ester degrading enrichments were initiated in a basal salts medium containing the following ingredients per liter: 50 ml of Pfenning's macro mineral solution, 1.0 ml of Pfennig's trace element solution, 0.1% (wt/vol) Difco yeast extract, 2mM Na$_2$SO$_4$, 10 mM NH$_4$Cl which supplements the ammonia levels provided by Pfennig's Macro mineral solution, 0.05% (wt/vol) cellobiose, 0.05% (wt/vol) sodium acetate. This solution was adjusted to pH 7.0 and a final volume of 945 ml before being autoclaved at 121° C. at 15 psi for 15 minutes. After cooling to room temperature, 50 ml of sterile 1M phosphate buffer and 5 ml of a complex vitamin solution which has been filtered through a 0.2 μm filter were added. The test cellulosic film was then added, and the flask was inoculated (5% v/v) with activated sludge (biomass) from the wastewater treatment system. The flask was placed on a New Brunswick shaker (Model 2300 Innova) situated in a walk in incubator held at 30° C. and 250 rpm. A stable microbial population was thus obtained by serially transferring the culture every 3 weeks. This basal salts media was used in all the in vitro film degradation experiments. Two examples of $_{14}$C cellulose acetate propionate (total DS=2.64 and 2.44) were prepared with $_{14}$C propionyl chloride labeled in the carboxyl carbon. These labeled samples were then incubated separately in the in vitro enrichment cultures for approximately 650 hours at 30° C. This system was chosen over a compost environment because of its higher degradative activity against cellulose esters.

Both samples showed less than 1% of the theoretical amount of radioactivity released as carbon dioxide in 644 hours. This demonstrates that only minor weight loss could have been expected from the CAP 482-20

(DS=2.8) component which was used in the blend with atactic poly(3-hydroxybutyrate, PHB) (Table 5).

The invention has been described in detail with particular reference to preferred embodiments thereof, but it will be understood that variations and modifications can be effected within the spirit and scope of the invention.

We claim:

1. A composition comprising poly(3-hydroxyalkanoate) containing recurring units of the formula:

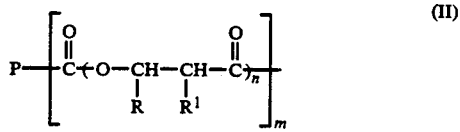

(II)

wherein n is an integer from 10 to 12,000; m is an integer of at least 2; R and $R^1$ are each independently selected from the group consisting of saturated and unsaturated $C_1$–$C_{20}$ alkyls and substituted alkyls, $C_3$ to $C_{10}$ aryls and substituted aryls, $C_5$ to $C_{10}$ cycloalkyls and substituted cycloalkyls and $R^1$ is also selected from hydrogen; and P is a monomeric carbon skeleton backbone or polymeric backbone bearing polycarboxylate functionality.

2. The composition according to claim 1 wherein m is an integer from 2 to 1,000 and n is an integer from 150 to 10,000.

3. The composition according to claim 2 wherein m is an integer from 3 to 100.

4. The composition according to claim 1 wherein P is a monomeric carbon skeleton backbone bearing polycarboxylate functionality.

5. The composition according to claim 1 wherein the poly(3-hydroxyalkanoate) has an inherent viscosity of about 0.2 to 6 at 25° C. on a 0.5 gram sample in 100 ml of a 60/40 by weight solution of phenol/tetrachloroethane.

6. The composition according to claim 1 wherein $R^1$ is hydrogen and R is selected from the group consisting of $C_1$ to $C_5$ alkyls and substituted alkyls.

7. The composition according to claim 1 wherein m is an integer of at least 3.

8. The composition according to claim 1 wherein P is selected from the group consisting of cellulose acetate succinate, 1,2,3-propanetricarboxylate, and 1,2,3,4-butanetetracarboxylate.

9. The composition according to claim 5 wherein the poly(3-hydroxyalkanoate) has an inherent viscosity of about 0.4 to 2 at 25° C. for a 0.5 gram sample in a 100 ml of a 60/40 by weight solution of phenol/tetrachlorethane.

10. The composition according to claim 1 wherein the poly(3-hydroxyalkanoate) has a polydispersity index greater than 1 to about 1.7.

11. The composition according to claim 6 wherein R is methyl.

12. The composition according to claim 11 wherein $R^1$ is hydrogen.

* * * * *